(12) United States Patent
Lareau et al.

(10) Patent No.: US 6,831,688 B2
(45) Date of Patent: Dec. 14, 2004

(54) MULTISPECTRAL OR HYPERSPECTRAL IMAGING SYSTEM AND METHOD FOR TACTICAL RECONNAISSANCE

(75) Inventors: Andre G. Lareau, Bloomingdale, IL (US); Bradford Speer, San Diego, CA (US); William R. Pfister, Rolling Meadows, IL (US); Stephen R. Beran, Mt. Prospect, IL (US); Barry Swartz, San Diego, CA (US); James P. Karins, Orlando, FL (US); Robert J. Lintell, Honolulu, HI (US); Christopher P. Warren, Carlsbad, CA (US)

(73) Assignee: Recon/Optical, Inc., Barrington, IL (US)

( * ) Notice: Subject to any disclaimer, the term of this patent is extended or adjusted under 35 U.S.C. 154(b) by 104 days.

(21) Appl. No.: 10/118,534

(22) Filed: Apr. 8, 2002

(65) Prior Publication Data

US 2003/0193589 A1 Oct. 16, 2003

(51) Int. Cl.$^7$ .............................................. H04N 5/335
(52) U.S. Cl. ..................... 348/272; 348/294; 348/340; 348/342; 356/419
(58) Field of Search ........................... 348/207.99, 272, 348/289, 290, 291, 294, 295, 297, 298, 311, 315, 316, 216.1, 217.1, 340, 269; 356/326, 419; 250/208.1

(56) References Cited

U.S. PATENT DOCUMENTS

| 4,497,540 | A | | 2/1985 | Breckinridge et al. |
| 5,155,597 | A | | 10/1992 | Lareau et al. |
| 5,173,748 | A | | 12/1992 | Bilhorn |
| 5,208,674 | A | * | 5/1993 | Setchell, Jr. ................ 348/269 |
| 5,231,502 | A | | 7/1993 | Pfister |
| 5,276,321 | A | | 1/1994 | Chang et al. |
| 5,379,065 | A | | 1/1995 | Cutts |
| 5,420,681 | A | * | 5/1995 | Woodruff .................... 356/326 |
| 5,760,899 | A | | 6/1998 | Eismann |
| 6,307,590 | B1 | * | 10/2001 | Yoshida ...................... 348/340 |
| 6,678,048 | B1 | | 1/2004 | Rienstra et al. |

OTHER PUBLICATIONS

Andrew D, Meigs, et al., "LWIR and MWIR Ultraspectral Fourier Transform Imager", Sensors, Systems, Next Generation Satellites, SPIE vol. 3221, pp. 421–428 (1997).

(List continued on next page.)

*Primary Examiner*—Tuan Ho
(74) *Attorney, Agent, or Firm*—McDonnell Boehnen Hulbert & Berghoff LLP

(57) ABSTRACT

A two-dimensional focal plane array (FPA) is divided into sub-arrays of rows and columns of pixels, each sub-array being responsive to light energy from a target object which has been separated by a spectral filter or other spectrum dividing element into a predetermined number of spectral bands. There is preferably one sub-array on the FPA for each predetermined spectral band. Each sub-array has its own read out channel to allow parallel and simultaneous readout of all sub-arrays of the array. The scene is scanned onto the array for simultaneous imaging of the terrain in many spectral bands. Time Delay and Integrate (TDI) techniques are used as a clocking mechanism within the sub-arrays to increase the signal to noise ratio (SNR) of the detected image. Additionally, the TDI length (i.e., number of rows of integration during the exposure) within each sub-array is adjustable to optimize and normalize the response of the photosensitive substrate to each spectral band. The array provides for parallel and simultaneous readout of each sub-array to increase the collection rate of the spectral imagery. All of these features serve to provide a substantial improvement in the area coverage of a hyperspectral imaging system while at the same time increasing the SNR of the detected spectral image.

52 Claims, 16 Drawing Sheets

(7 of 16 Drawing Sheet(s) Filed in Color)

OTHER PUBLICATIONS

H. Koshiishi, *Development of Advanced Imaging Radiometers, Advances in Space Research*, 1997, vol. 19, Part 9, pp. 1367–1370.

S. Sandor–Leahy, *The TRWIS III Hyperspectral Imager: Instrument Performance and Remote Sensing Applications, Proceedings of the SPIE*, 1998, vol. 3438, pp. 13–22.

A.Daniels, *On–focal Plane Processing Techniques for Infrared Detectors for Hyperspectral Applications, Proceedings of the SPIE*, 1998, vol. 3379, pp. 318–332.

S. G. Chamberlain et al., *A 26.2 Million Pixel CCD Image Sensor, Proceedings of the SPIE*, vol. 1900, pp. 181–191 (Feb. 1993).

M. Farrier et al., *Megapixel Image Sensors with Forward Motion Compensation for Aerial Reconnaissance Applications, SPIE*, vol. 2023 Airborne Reconnaissance XVII (1993), pp. 80–92.

Eric J. Lerner, *Multi– and Hyperspectral Detectors Transform Sensing, Laser Focus World*, Sep. 2001, pp. 97–100.

* cited by examiner

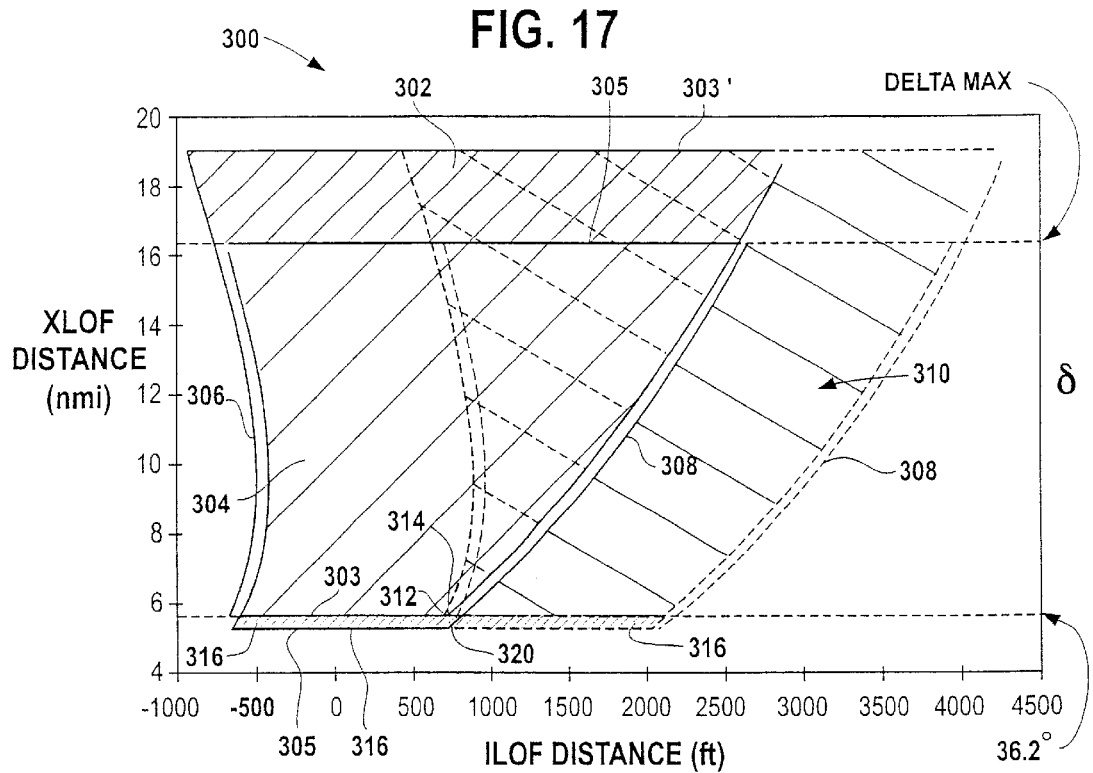

FIG. 17

MISSION PARAMETER SUMMARY

| | |
|---|---|
| NUMBER OF HYPER CHANNELS, | $N = 30$ |
| NUMBER OF PIXELS PER CHANNEL, | $TDI = 33$ |
| NUMBER OF TDI, | $L = 1042$ |
| CYCLE TIME IN SECONDS, | $t_{cycle} = 1.1389$ |
| PIXEL SIZE IN MM, | $P_x = 0.024$ |
| INTEGRATION TIME IN SECONDS, | $t_{int} = 0.0024$ |
| SCAN RATE IN DEGREES/SECOND, | $\omega_r = 24.239$ |
| ALTITUDE IN FEET, | $H = 2.5 * 10^4$ |
| FOCAL LENGTH IN INCHES, | $fl = 30$ |
| LENS F-NUMBER, | $f_{no} = 2.4$ |
| RETRACE TIME IN SECONDS, | $t_R = 0.4$ |
| AIRCRAFT VELOCITY IN FEET/SECOND, | $V = 1*10^3$ |
| AREA COVERAGE IN NMI²/HR, | $AREA = 6.365*10^3$ |
| CROSS TRACK DIST. IN FEET, | $XLOF = 6.528*10^4$ |
| DEPRESSION ANGLE IN DEGREES, | $\delta_A = 36.2$ |

MULTISPECTRAL OR HYPERSPECTRAL IMAGING SYSTEM AND METHOD FOR TACTICAL RECONNAISSANCE

BACKGROUND OF THE INVENTION

A. Field of the Invention

This invention relates generally to hyperspectral and mutispectral imaging systems for aerial reconnaissance and surveillance applications using a wafer-scale Focal Plane Array (FPA) of an area array format. In this art, "hyperspectral" imaging systems refer to those in which radiation at thirty or more discrete wavelengths are imaged. Imagers that image a lesser but plural number of spectral bands are referred to as "multispectral" imagers. Such systems are used in various applications, including Department of Defense satellite systems and commercial land resource management imaging systems.

The invention further relates to a scanning method for directing a spectrally separated image of the object under surveillance over the FPA in a predetermined direction and rate. In another aspect, the invention further relates to a time delay and integrate (TDI) clocking technique in which the FPA is separated into discrete sub-arrays, in which the length of TDI clocking within each sub-array is predetermined according to the spectral responsiveness of the detector material to each spectral band detected by each sub-array. The present invention provides improvement over the prior art by significantly increasing the area of coverage scanned by a multispectral or hyperspectral imaging system.

B. Description of Related Art

Hyperspectral imaging is a well established art based on the science of spectroradiometers and spectral imaging. In hyperspectral imaging, image radiation is separated into its spectral components using optical elements such as filters, prisms or diffraction gratings, and the separated radiation is imaged by a detector. This section will briefly review the state of the art and cite to several references and patents discussing background art. The entire content of each of the references and patents cited in this document is incorporated by reference herein.

Discussion of the basic hyperspectral imaging technology can be found in such references as *The Infra-Red & Electro-Optical Handbook*, Vol. 1, George J. Zissis, Editor, Sources of Radiation, pp. 334–347. Spectroradiometers applied to reconnaissance applications are called imaging spectrometers, wherein each image is collected in a number of spectral wavelengths.

The fundamental design of imaging spectrometers can be traced to Breckinridge, et. al., U.S. Pat. No. 4,497,540. In this patent, a scene is imaged on slit and dispersed using a diffraction grating or prism to illuminate a detector array. All spectral channels are acquired simultaneously and the field of view in each channel is precisely the same. This can be contrasted to "spectral imaging", in which different spectral channels are acquired sequentially in time, i.e. through filters, and are not inherently spatially registered to one another.

The common elements of a hyperspectral imaging spectrometer system are shown in FIG. 1. Target imagery is projected through a fore-optic 10 into the aperture slit 12 of a spectrometer system 14. The spectrometer 14 includes an optical grating 16, which serves to diffract the image into its spectral elements. The diffracted image is imaged by camera optics 18 onto a focal plane array detector 20. Each image 22 generated by detector extends in one spatial direction, typically across the line of flight. A slice of the image in that spatial direction is imaged in a large number (thirty or more) different bands of the spectrum. As the platform flies pasts the terrain of interest (or as different terrain is scanned onto the imager with a scanning device) successive images 22 are generated, each in one spatial direction. When the series of images are combined, they yield an "image cube" 24, covering the terrain of interest in two orthogonal directions in a multitude of spectra.

The width of the slit 12 is directly proportional to the amount of radiation, and therefore the signal-to-noise-ratio, of the system. And, it is inversely proportional to the spatial resolution. That is, the wider the slit, the worse the spatial resolving power of the system. On the other hand, the spectral resolution of the system is dependent on the optical parameters of the diffraction grating and the number of pixel elements of the detector. The higher the quality (blaze) of the diffraction grating 16 and the greater the number of pixels on the focal plane 20, the higher the spectral resolution.

In a typical operation, the hyperspectral system is moved over the scene of interest either by moving the entire system (i.e. "pushbroom") or by movement of a scan mirror (not shown). As objects enter the field of view of the aperture slit 12, they are diffracted into their spectral colors and projected through the camera lens 18 to the detector array 20. Thus, each line of the target area is projected as a two dimensional image onto the detector, with one dimension representing a spatial axis of the image in-line-of-flight (ILOF) or cross-line-of-flight (XLOF), depending on camera orientation and scanning mode, and the other dimension representing the spectrum of the image. The combination of the scanning action of the camera, either by pushbroom or scan mirror, with the frame rate of the focal plane array, determines the number of "frames" of the resulting image.

A number of frames of the image will provide spatial resolution in the scan direction. Typically, a design will call for roughly equal resolution in both directions. In this fashion, an image "cube" 24 is thus created wherein the hyperspectral imagery is subsequently processed to detect object features of interest to the image analyst. There exists a tremendous body of knowledge regarding the processing of hyperspectral imagery and how it applies to target "phenomenology", which is outside the scope of this disclosure. For up to date background information on the processing of hyperspectral imagery see, for example, SPIE Proceedings, Vol. 3372, *Algorithms for Multispectral and Hyperspectral Imagery IV*, Apr. 13–14, 1998.

A common example of a hyperspectral imaging spectrometer is the NASA HIRIS instrument, which is designed to image the earth's surface from an 800-km altitude. The earth's surface is focused on a narrow slit and then dispersed and refocused onto a two dimensional focal plane array. Each time the satellite progresses around the earth by the equivalent of one pixel, the focal plane is read out and one frame of the image "cube" is created. It is commonly recognized that systems such as HIRIS have the limitations of limited resolution, limited exposure time and spatial smearing. There exists a large open literature which discusses technological issues pertaining to hyperspectral imaging systems, major development programs and existing national and commercially available systems. See, for example, Kristin Lewotsky, "Hyperspectral imaging: evolution of imaging spectrometry", *OE Reports*, November 1994. For a comprehensive reference list of imaging spectrometers, see Herbert J. Kramer, *Observation of the Earth and Its Environment—Survey of Missions and Sensors*, Second Edition, Springer-Verlag, 1994.

Spectroscopy using a large format, two-dimensional CCD in a scanning configuration is disclosed in Bilhorn, U.S. Pat. No. 5,173,748 entitled *Scanning Multi-Channel Spectrometry using a Charge-Coupled Device (CCD) in Time-Delay Integration (TDI) Mode*. Bilhorn discloses a technique in which the performance of a spectrometer is improved by scanning the dispersed spectrum across a Time Delay and Integrate (TDI) CCD array synchronously with the clocking of the charge within the array. This technique in Bilhorn affords an accumulation of signal charge from each wavelength of the spectrum, which eliminates the need to compensate for throughput variations commonly found when using other detector approaches such as photodiode arrays, and increases the overall response of the spectrometer. This invention was designed for the use of determining the spectrum of a polychromatic light source in a laboratory environment where a slit is adjusted to achieve the best compromise between light throughput and spectral resolution.

U.S. Pat. No. 5,379,065 to Cutts discloses a method of performing spectral imaging in low earth orbit with rapid image motion, without the limitations identified in the above example, by the use of a spectrally agile filter using Acusto Optic Tunable Filtering (AOTF) technology. The technique relies on the use of a fixed slit, the ability of the AOTF to shutter the FPA and motion compensation accomplished by synchronizing movement of charges located within the FPA with the moving image during the exposure time. The invention synchronizes changes in spectral pass band with frame transfers of the focal plane array imager. Different spectral bands are given different exposure times to maximize the signal to noise across the entire spectrum.

U.S. Pat. No. 5,760,899 by Eismann, entitled High-Sensitivity Multispectral Sensor, discloses the use of a dispersive spectrometer and filtered TDI detector to improve dwell time, temporal simultaneity and spatial registration. In his preferred embodiment, however, Eismann does not use TDI in the conventional manner. Rather, Eismann discloses TDI segments which are formed from a discrete set of non-contiguous, equally spaced field angles, with TDI preferably achieved off-chip; that is, the array is read out in frames and the properly shifted rows are digitally summed on a frame-to-frame basis. He later describes this as "frame averaging" (Col. 6, Line 57). The benefit achieved from his approach is the fact that all spectra of interest are collected simultaneously, avoiding a temporal delay and therefore distortion in the resulting image cube. As a byproduct of his spectral imaging technique, Eismann must reduce the velocity of the platform carrying the hyperspectral sensor in order to achieve a sufficient increase in signal performance (Col. 5, Line 50–52). This is highly undesirable and unusable for applications in high-speed reconnaissance aircraft, particularly in a military reconnaissance situation.

Further background art exists in the field of wafer scale FPA processing as related to airborne tactical reconnaissance applications. See, for example, Lareau, et al., U.S. Pat. No. 5,155,597, which describes an wafer-scale electro-optical imaging array. Wafer-scale focal plane arrays are now well known in the art and information describing their design and use in reconnaissance applications can be found at several places in the literature, including: S. J. Strunk, J. McMacken, S. Kamasz, W. Washkurak, F. Ma, and S. G. Chamberlain, "*The Development of a 4 Million Pixel CCD Imager for Aerial Reconnaissance*", SPIE Vol. 1763, Airborne Reconnaissance XVI, July 1992, pp. 25–36; M. Farrier, S. R. Kamasz, F. Ma, W. D. Washkurak, S. G. Chamberlain and P. T. Jenkins, "*Megapixel Image Sensors with Forward Motion Compensation for Aerial Reconnaissance Applications*", SPIE Vo. 2023, Airborne Reconnaissance XVII, 12–14 Jul. 1993; S. G. Chamberlain, et. al., "*25 Million pixel CCD image sensor*," SPIE Proceedings, Vol. 1900, Charge-Coupled Devices and Solid State Optical Sensors III, 2–3 Feb. 1993; and, A. G. Lareau, "*Electro-Optical imaging array with motion compensation*," SPIE Proceedings, Vol. 2023, Airborne Reconnaissance XVII, 12–14 Jul. 1993, pp. 65–79. In the preferred embodiments of the present invention, the focal plane array is as large as possible, preferable being of "wafer-scale", implying a size of at least 60-mm on a side for 4-inch wafer processing or 80-mm on a side for 6-inch wafer processing.

Still further background art exists regarding the Quantum Efficiency (QE) and responsivity of semiconductor detector devices and the TDI technique used to improve the SNR within detector devices. It is well known within the art of developing imaging Focal Plane Arrays that the QE and responsiveness of the detector material varies according to the wavelength (frequency) of the light energy which it is detecting. For example, information on the spectral response characteristics of the silicon in regards to FPA processing can be found in S. M. Sze, *Physics of Semiconductor Devices*, Ch. 7, John Wiley & Sons, Inc. (1981). To increase the signal level for images with overall low illumination or to improve signal levels for images with spectral content for which the array has a poor responsivity, it is common to use a TDI technique with some type of a scanning mechanism. TDI techniques are again well known in the art. Background information for that technique can be found, for example, in the patent to William R. Pfister, U.S. Pat. No. 5,231,502.

Closer to the field of airborne tactical reconnaissance, another recent development has been publicly released by the United State Navy's Naval Research Laboratory called Dark Horse 1. It is known as the "Autonomous Airborne Hyperspectral Imaging and Cueing System", and was flown aboard a P-3 aircraft at the Patuxent River Naval Air Station, Lexington Park, Md., in 1999. It uses a grating type spectrometer with a 50-$\mu$m slit to project 64 bands within the 400–850 nm spectrum onto a 512×512 pixel FPA at 100 frames per second. The FPA pixel size is 15-$\mu$m which yields a 1.3-m resolution XLOF from 7100-ft vertical through a 50-mm lens with 2:1 pixel binning. The Dark Horse camera was used to cue a high resolution tactical reconnaissance camera, the CA-260, manufactured by Recon/Optical, Inc. with a 12-in focal length and a 12-$\mu$m pixel pitch, 5000× 5000 pixel, wafer scale FPA. Although the results of the demonstration were considered a great success, they also served to emphasize the severe limitation of modern hyperspectral sensors in terms of area coverage. As flown, the Dark Horse sensor demonstrated a coverage capability of only 34.8-nmi$^2$/hr, which is far below the existing capability of high resolution monochromatic coverage rates of 8000 to 10000- nmi$^2$/hr. And further, even at that reduced coverage rate, the sensor achieved resolutions of 4.2-m in the in-line of flight direction (ILOF) and 1.3-m in the cross-line of flight (XLOF) which is worse than the 1-m resolution stated goal. More details about this system can be obtained from the Naval Research Laboratories, Optical Sciences Division, Advanced Concepts Branch, Code 5620, Washington, D.C. 20375.

So, it is easy to see that to be effective as a cueing sensor, a dramatic increase in coverage capability and resolution of hyperspectral sensors is needed. The hyperspectral FPA of the present invention meets these needs by providing both a significant increase in coverage capability, and high resolution.

SUMMARY OF THE INVENTION

In one aspect, a hyperspectral system is provided based on an electro-optical imaging array arranged as a plurality of rows and columns of individual pixel elements. The array is organized into a plurality of sub-arrays of rows of pixels, each sub-array being responsive to incident radiation from a scene of interest. A multi-spectral or hyper-spectral filter is placed in registry with the electro-optical imaging array. The filter defines a plurality of individual filter bands arranged in optical registry with the sub-arrays whereby each of the sub-arrays receives radiation passing through one of the individual filter bands. A scanning device is provided directing radiation from the scene of interest onto the imaging array. The array and scanning device constructed and arranged such that as the scene of interest is scanned over the array a given point in the scene of interest is sequentially imaged by each of the sub-arrays. In other words, various parts of the scene are imaged simultaneously in different spectral bands but as the scene is scanned each point in the scene is imaged in every spectral band. Clocking circuitry is provided to accomplish movement of charges among the individual pixel elements within each of the sub-arrays in a rate and direction synchronous with the image motion. This allows for increased signal collection, thereby improving the signal to noise ratio of imagery from the array. CMOS and/or CCD implementations are expressly contemplated as possible architectures for the array.

Various novel aspects of the invention include, but are not limited to, the use of an area array FPA in a scanning configuration for simultaneous imaging of many spectral bands. Further, the area array FPA is arranged into the pre-determined number of contiguous sub-arrays which each correspond to a spectral band of the target object. The clocking techniques, which in the illustrated embodiment take the form of TDI techniques, are used as a clocking mechanism within the sub-arrays to increase the SNR of the detected image. Additionally, in one possible embodiment, the TDI length (i.e., number of rows of integration during the exposure) within each sub-array is adjustable to optimize the material response to each spectral band. The array preferably provides for parallel and simultaneous readout of each sub-array to increase the collection rate of the spectral imagery.

In another aspect, a method is provided for obtaining images of a scene of interest in multiple portions of the electromagnetic spectrum with a hyperspectral or multi-spectral imaging system aboard a reconnaissance vehicle. The method comprising the steps of exposing a two-dimensional electro-optical array to scene. The array is arranged as a plurality of rows and columns of individual pixel elements, with the array organized into a plurality of sub-arrays of rows of said pixels. The method continues with the step of controlling the wavelength of the radiation impinging on each of the sub-arrays wherein each sub-array images a different band of the electromagnetic spectrum while the array is exposed. The sub-arrays are exposed to the scene of interest at the same time, with each of the sub-arrays imaging a different portion of the scene of interest simultaneously in a particular band of the spectrum. The method further continues with the step of operating a scanning device for the array so as to scan across the scene of interest while the array is exposed to the scene to thereby direct adjacent portions of the scene of interest onto the imaging array. While the imaging array is exposed to the scene, individual pixel elements of the array are clocked in synchronism with image motion occurring in a direction and at a rate to thereby increase the signal to noise ratio of the collected signal.

Additionally, in one possible embodiment, the TDI length (i.e., number of rows of integration during the exposure) within each sub-array is adjustable to optimize the material response to each spectral band. The array provides for parallel and simultaneous readout of each sub-array to increase the collection rate of the spectral imagery. These features serve to provide a substantial improvement over prior art by dramatically increasing the area imaged per unit of time by a hyperspectral or multispectral imaging system while at the same time increasing the signal to noise ratio of the detected spectral image.

BRIEF DESCRIPTION OF THE DRAWINGS

The patent or application file contains at least one drawing executed in color. Copies of the patent or patent application publication with color drawing(s) will be provided by the office upon request and payment of the necessary fee.

FIG. 17 is an illustration of the operational coverage of one representative embodiment of the invention for two successive scans in the cross-line of flight direction.

DETAILED DESCRIPTION OF REPRESENTATIVE PREFERRED AND ALTERNATIVE EMBODIMENTS

Figure 1:
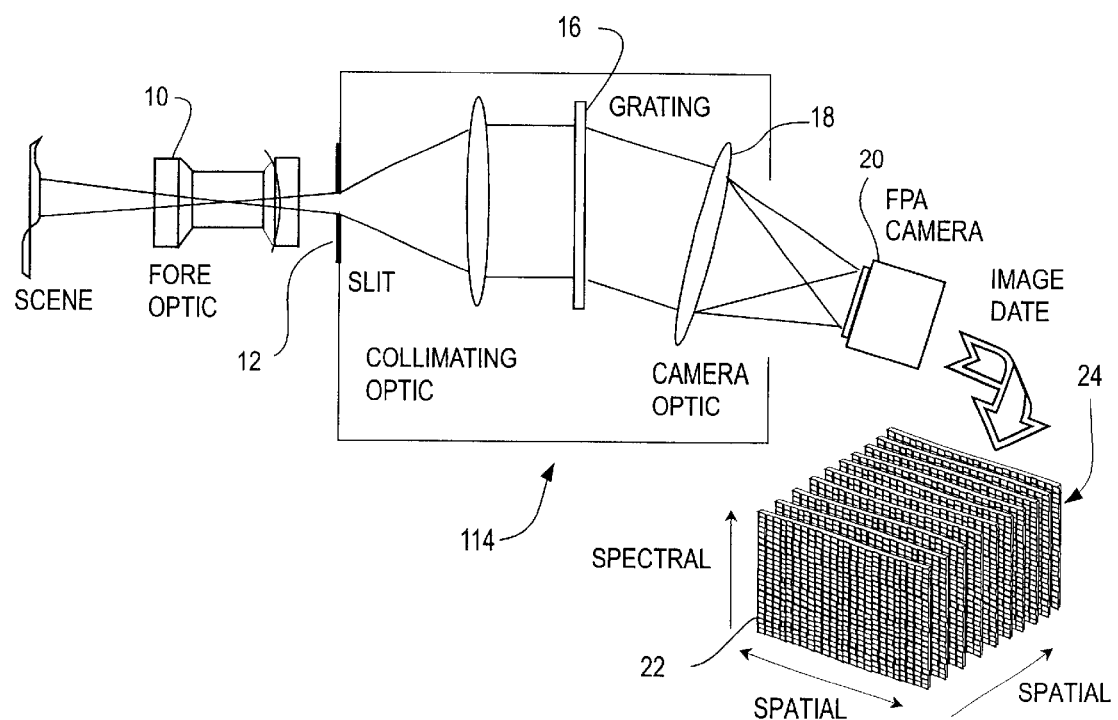
FIG. 1 is a schematic diagram of the basic design of a prior art hyperspectral imaging system.
Figure 2:
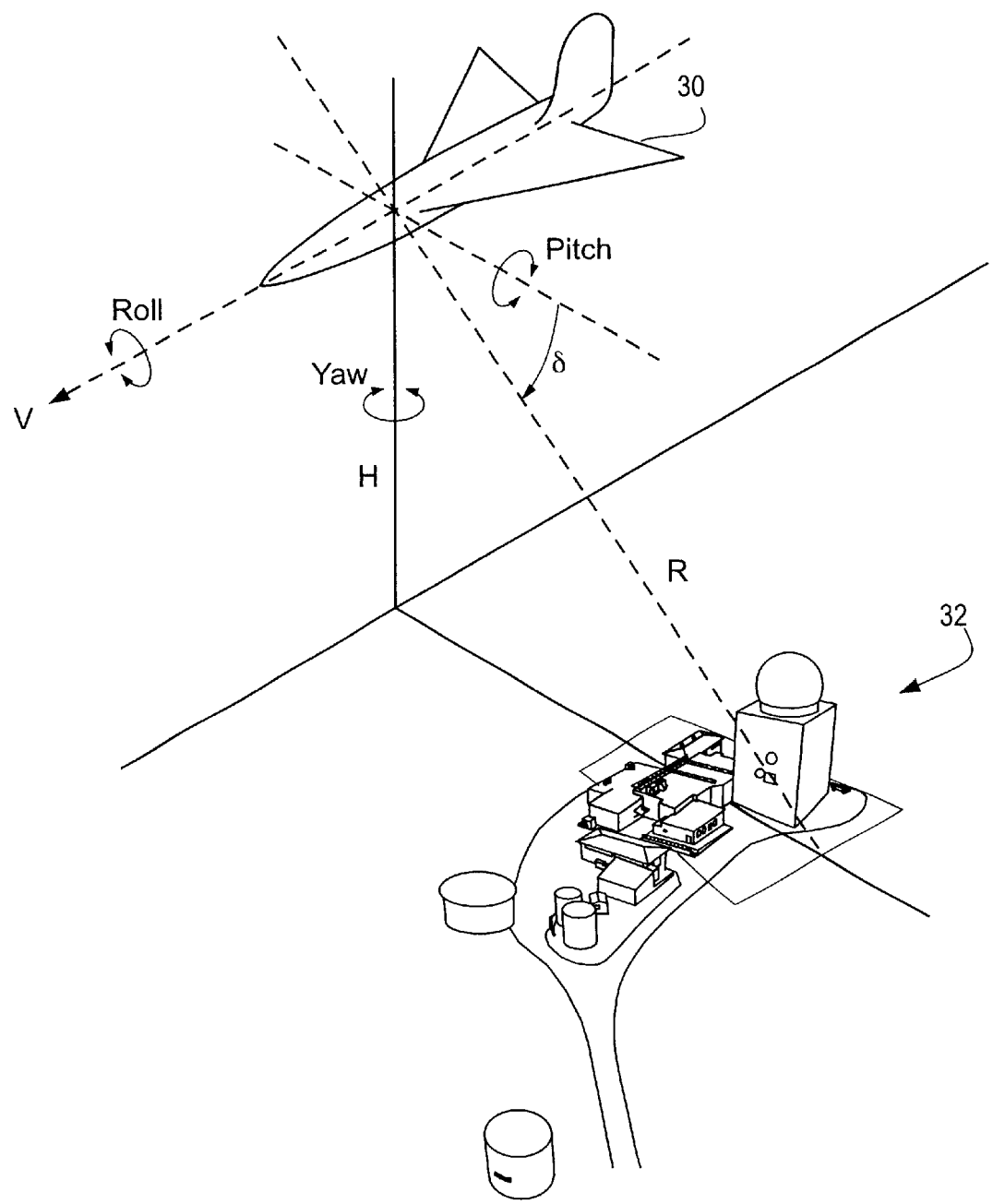
FIG. 2 is an illustration of a reconnaissance aircraft flying past a scene of interest and taking pictures in a side oblique reconnaissance mode.

In order to understand the limitations of the prior art and the advantages and improvements of the present invention, the problem of hyperspectral imaging in a side oblique mode of operation will be examined in further detail in conjunction with the example given in FIG. 2.

FIG. 2 shows a side oblique mission scenario wherein a tactical aircraft 30 is monochromatically imaging a target area 32 with typical image parameters as follows: Altitude—25,000 feet; Velocity—480 kts; Depression Angle—30-deg. The aircraft 30 includes a reconnaissance system having a 25-Mpixel square focal plane area array, 10-micron pixel size and 50-in focal length lens. The resolution of the imaging system (ignoring atmospherics and assuming a tangential target at the center of the frame) is 0.8-ft/lp and the cross-line of flight (XLOF) ground coverage is 3943-ft. In order to get continuous coverage in line of flight (ILOF) at the near edge of the frame of imagery, the camera needs to take one frame of imagery every 2.3 seconds, which is not a demanding requirement.

However, the task becomes quite more intimidating when the parameters of a hyperspectral or multispectral image are considered. If, for example, the monochromatic wavelength band of 450 to 950 nm is divided into fifty 10-nm hyperspectral bands with the goal of obtaining a complete frame of imagery for each of the spectral bands, the camera system must now take 21 frames per second for continuous coverage ILOF with an information data rate of 6.3-Gb/s at 12-bit quantization.

It is also a factor to consider that in dividing the spectrum into 10-nm slices we have also divided the total energy collected by the focal plane array for any single spectral slice to $1/50^{th}$ of its value in the monochromatic case, depending on the detector response curve. This indicates the need for a dramatic increase in integration time when in fact, due to the necessary increase in frame rate, we have much less. Typical integration times for monochromatic imaging for tactical reconnaissance missions vary between 0.3 and 16-ms, which would correspond to hyperspectral imaging integration times of 1.5 to 800-ms assuming all optical parameters, such as f number, etc., remain the same. Limiting the integration time of a system operating at 21 fames/second to the entire 47-ms frame time, if that were even practical, would result in a significantly starved signal image under most imaging conditions. Thus, from data rate and signal level considerations, a "brute-force" hyperspectral approach of this type becomes impractical.

The obvious solution used to solve this problem for various hyperspectral imaging applications is to use smaller size Focal Plane Arrays (FPA's), lower frame rates and "pixel binning," such as was used in the Dark Horse example above. Pixel binning is the process of combining adjacent pixels directly on the FPA for the purpose of increasing the total detected signal charge within the combined pixel well without increasing FPA noise sources, and for reducing the total number of pixels which have to be read out of the FPA. This process reduces the resolution of the system at the detector but more importantly increases the SNR and reduces the system output data rate.

Consider, for example, a system design using a 1024-pixel square focal plane with 18-micron pixels and a 50-in focal length lens. For an aircraft flying at an altitude of 25,000 feet at a velocity of 200 knots, and a maximum depression angle of 15 degrees, with a 200 ms integration time, the required scan time for a 0.144-deg scan is 3.95-seconds. This type of performance may be acceptable for some remote sensing applications but in a hostile military tactical reconnaissance situation it is completely inadequate: the field of view scanned is too small, the aircraft velocity is too slow, the depression angle is too shallow and the scan time is too long. Clearly, smaller size FPA's, lower frame rates and "pixel binning" is not the solution for the tactical reconnaissance application. With a larger degree scan, such as 0.5 degrees, the required scan time is even larger, which is again an intolerable result for military reconnaissance.

Figure 3:
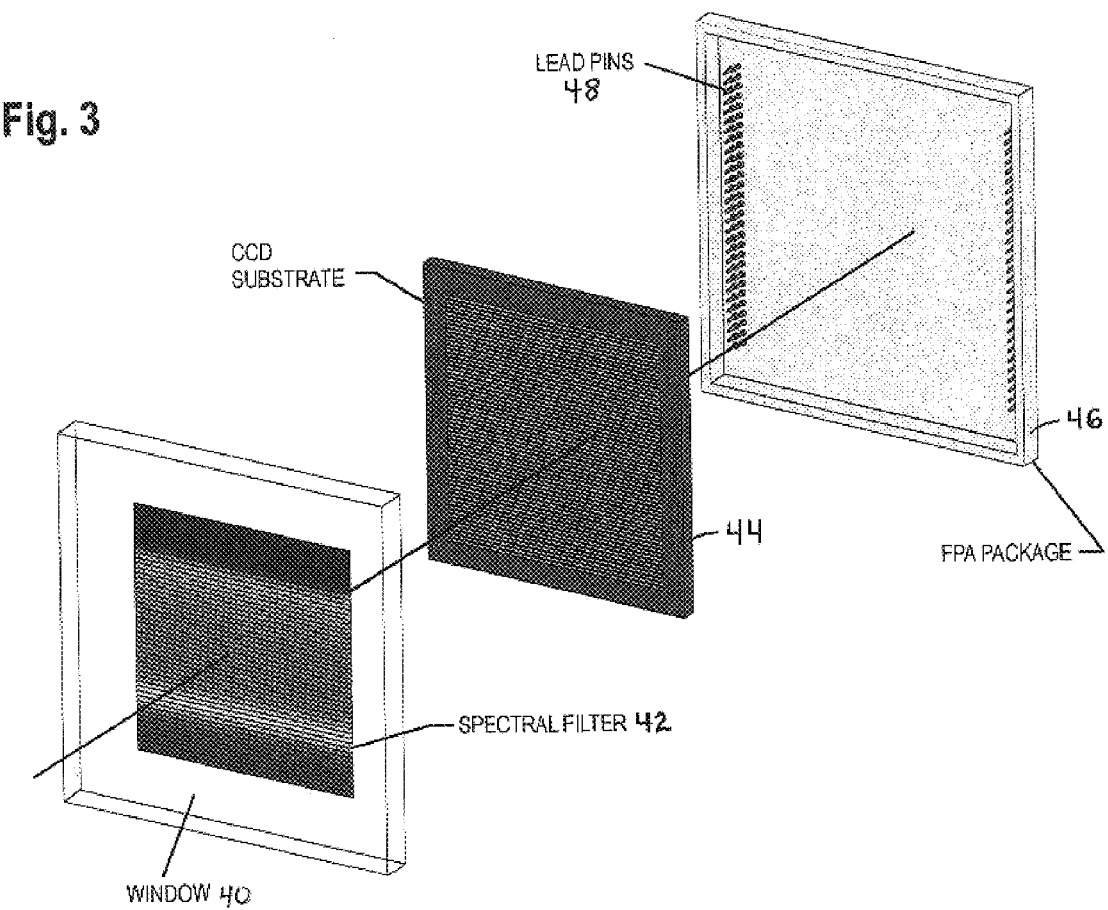
FIG. 3 is an exploded view of a hyperspectral imaging array in accordance with one possible embodiment of the invention.

FIG. 3 shows a hyperspectral imaging system in accordance with one possible embodiment of the invention, in an exploded view. The system includes a window 40 incorporating a spectral filter 42 comprising a plurality of individual filter bands passing radiation in a discrete portion of the spectrum. The spectral filter directly overlies a two dimensional CCD array 44. The CCD array 44 is arranged as rows and columns of individual photo-sensitive pixel elements. The CCD FPA package 46 includes lead pins 48 for conductors that control the clocking of rows and columns of pixels.

The CCD 44 is divided into contiguous sub-arrays of rows and columns of pixels. Each sub-array is responsive to light energy from a target object which has been separated by means of the spectral filter 42 into a predetermined number of spectral bands. There is one sub-array on the FPA 44 for each predetermined spectral band. The spectral filter 42 is placed directly over the array 44 and is spatially registered to provide a discrete spectral image to each sub-array. Each sub-array has its own read-out channel to allow parallel and simultaneous readout of all sub-arrays of the array. The sub-arrays are shown in subsequent figures and described in more detail below.

Figure 12:
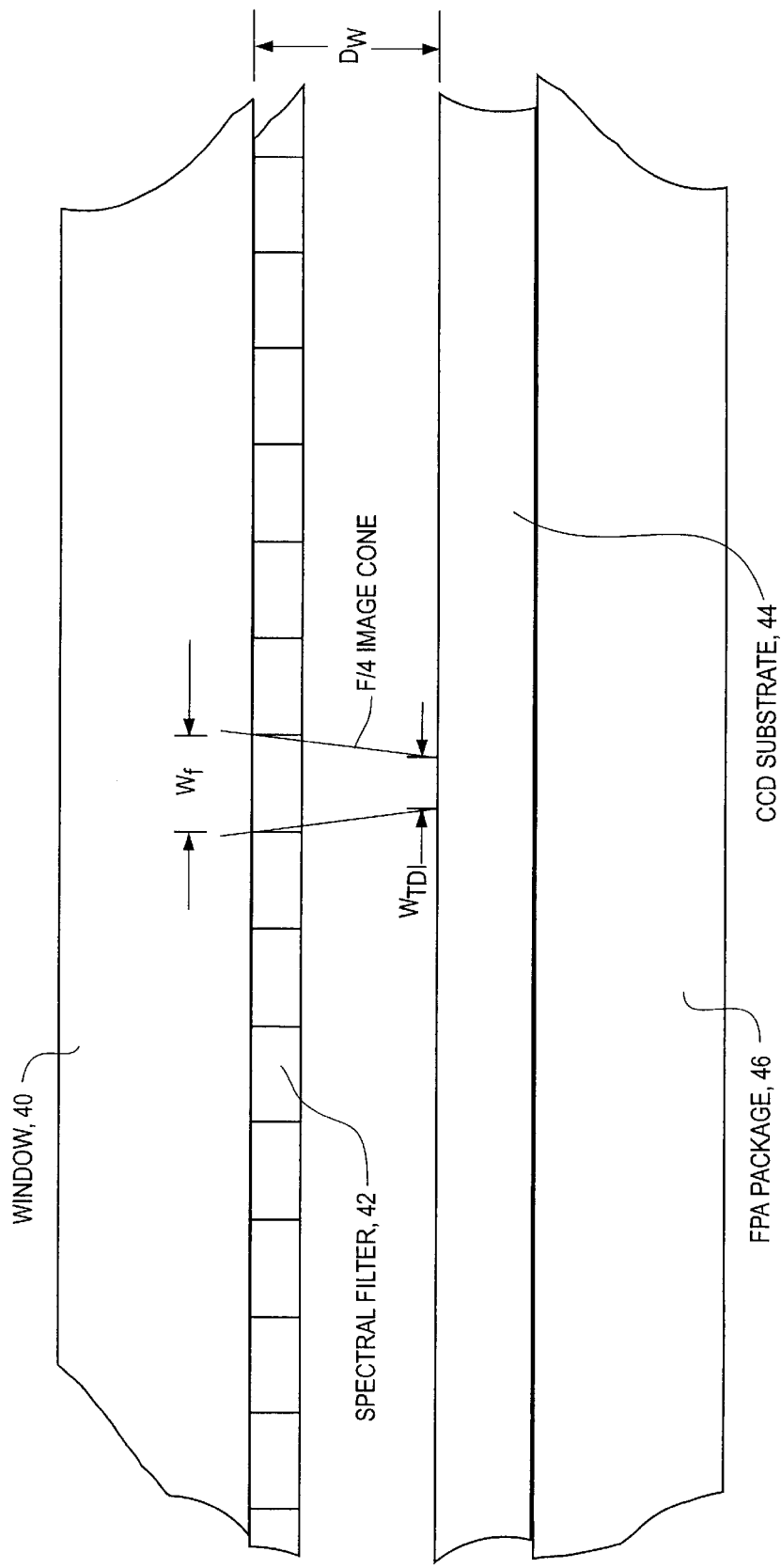
FIG. 12 is a cross-section of the array and filter.

The spectral filter element 42 is manufactured by a multi-layered or variable interference process onto a glass substrate (window 40). For a visible spectrum embodiment, the window 40 can be made of BK-7 or other material with high transmission in the visible spectrum. This filter 42 can be manufactured by various means. The filter also serves as the window cover to the focal plane array package. This embodiment eliminates the need for the spectrometer, which itself is a complex optical-mechanical instrument requiring careful manufacturing processes, alignment and calibration. The geometric arrangement of the filter relative to the FPA 44 is shown in cross section in FIG. 12. The width of each spectral filter band (Wf) in the filter 42 produces an f/4 image cone, wherein radiation in a particular band images on a particular sub-array of the CCD substrate 44. The number of bands for the filter can vary depending on whether the system is a hyperspectral or multispectral system. Preferably at least four bands are provided. Radiation passes through each band and is imaged by a corresponding sub-array in the CCD substrate or FPA 44.

The choice of material for the substrate of the filter 42 (window 40) will depend on the portion of the spectrum that the imaging system is designed to operate in. The material is selected such that it passes radiation in the band of interest. For example, for a MWIR multi-spectral or hyperspectral embodiment, the window 40 needs to pass radiation in the MWIR band, and a material such as silicon is a suitable choice. For a LWIR multi-spectral or hyperspectral embodiment, a material such as germanium is a suitable choice. Regardless of the choice of material, the filter coating is applied to the surface of the window 42 to provide a plurality of filter bands that pass radiation in discrete portions of the band of interest.

TDI techniques are used as a clocking mechanism within the sub-arrays to increase the SNR of the detected image. Pixel information is transferred in the column direction at a rate corresponding to image motion due to scanning to thereby increase signal collection. Additionally, the TDI length (i.e., number of rows of integration during the exposure) within each sub-array is preferably adjustable to optimize the material response to each spectral band. The array provides for parallel and simultaneous readout of each sub-array to increase the collection rate of the spectral imagery.

Each sub-array in the FPA 44 eventually images the same part of the scene due to a scanning of the scene across the FPA using a scanning mirror. The scanning operation is explained in further detail in conjunction with FIG. 10 below. However, when the array is initially exposed to the scene, each sub-array images a different portion of the scene in its own particular wavelength, as dictated by the construction of the filter 42. By scanning across the scene of interest, a given portion of the scene is imaged by all the different sub-arrays. Thus, the combination of the scanning and the array and filter design both spectral and spatial resolution across the scene of interest is achieved. This will be more apparent from the discussion of FIGS. 13–15 later in this document.

Figure 4:
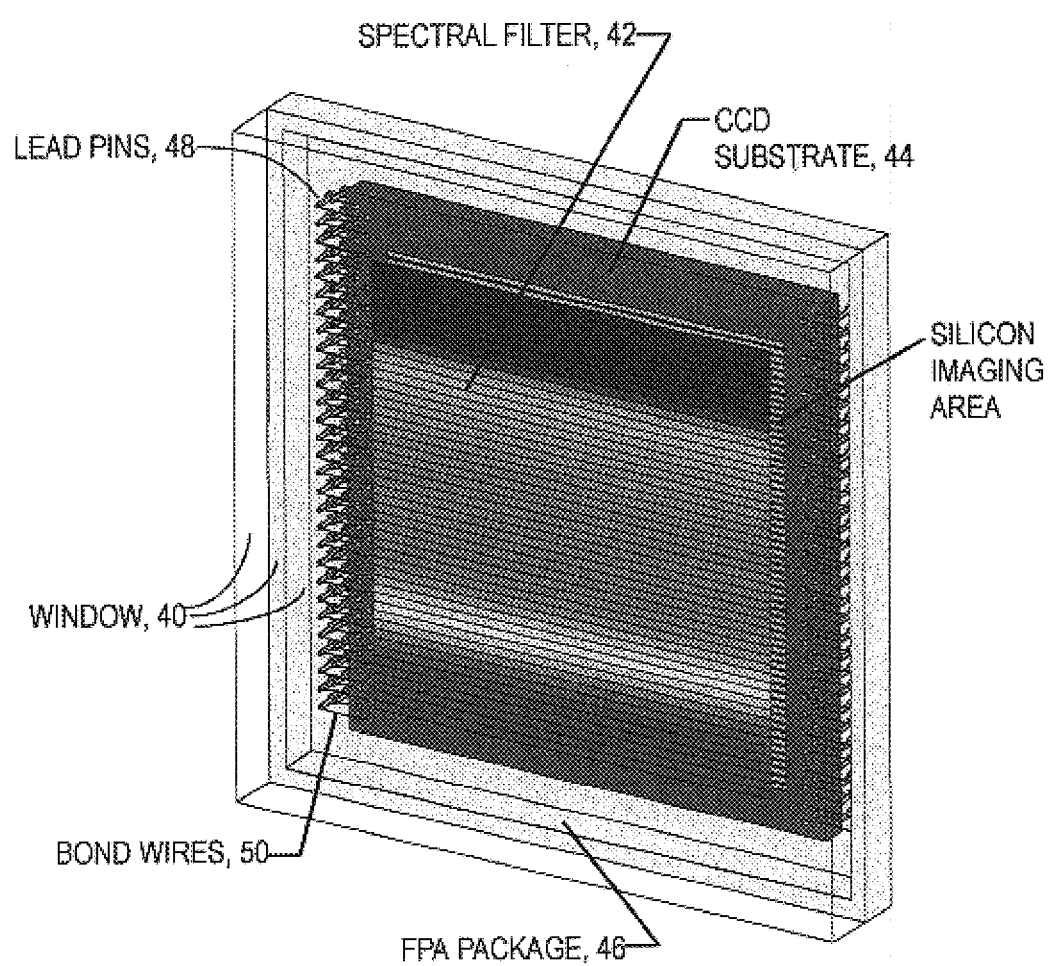
FIG. 4 is a more detailed perspective view of the CCD focal plane array assembly of FIG. 3.

FIG. 4 is a more detailed perspective view of the CCD focal plane array assembly of FIG. 3, showing details of the CCD substrate 44 mounted in the FPA package assembly 46 with bond wires 50 connecting the bond-out pads on the CCD substrate to the lead pins 48 of the FPA package. The bond wires 50 allow the CCD clocking, bias and readout signals to be connected to further electronics for A/D conversion and signal processing, etc. The window assembly 40, preferably made from a material that has a high transmission in the spectrum of interest, such as BK-7 for the visible spectrum, covers the entire FPA 44 and is typically hermetically sealed to the FPA package 46 to allow the internal atmosphere of the package to be filled with an inert gas such as Nitrogen.

Figure 5:
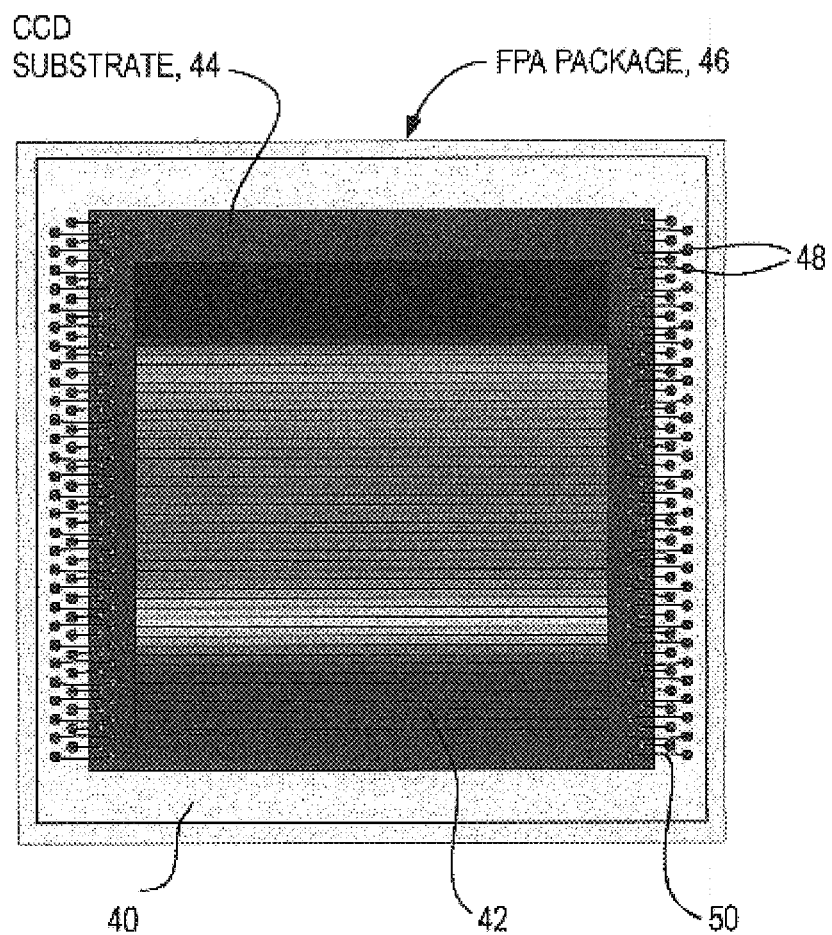
FIG. 5 is front view of the assembly of FIG. 3 showing the individual components thereof.
Figure 6:
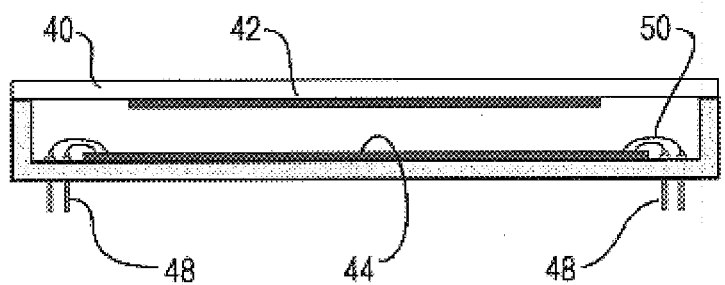
FIG. 6 is a side view of the assembly of FIG. 3.

FIG. 5 is a front view of the assembly showing the individual components thereof. FIG. 6 is a side view of the assembly and the mounting of the CCD substrate 46 inside the FPA package cavity, which is typically accomplished with an epoxy type adhesive. Also shown is a side view of the bond wires 50 connecting the FPA package lead pins 48 to the CCD substrate bond out pads 52.

Figure 7:
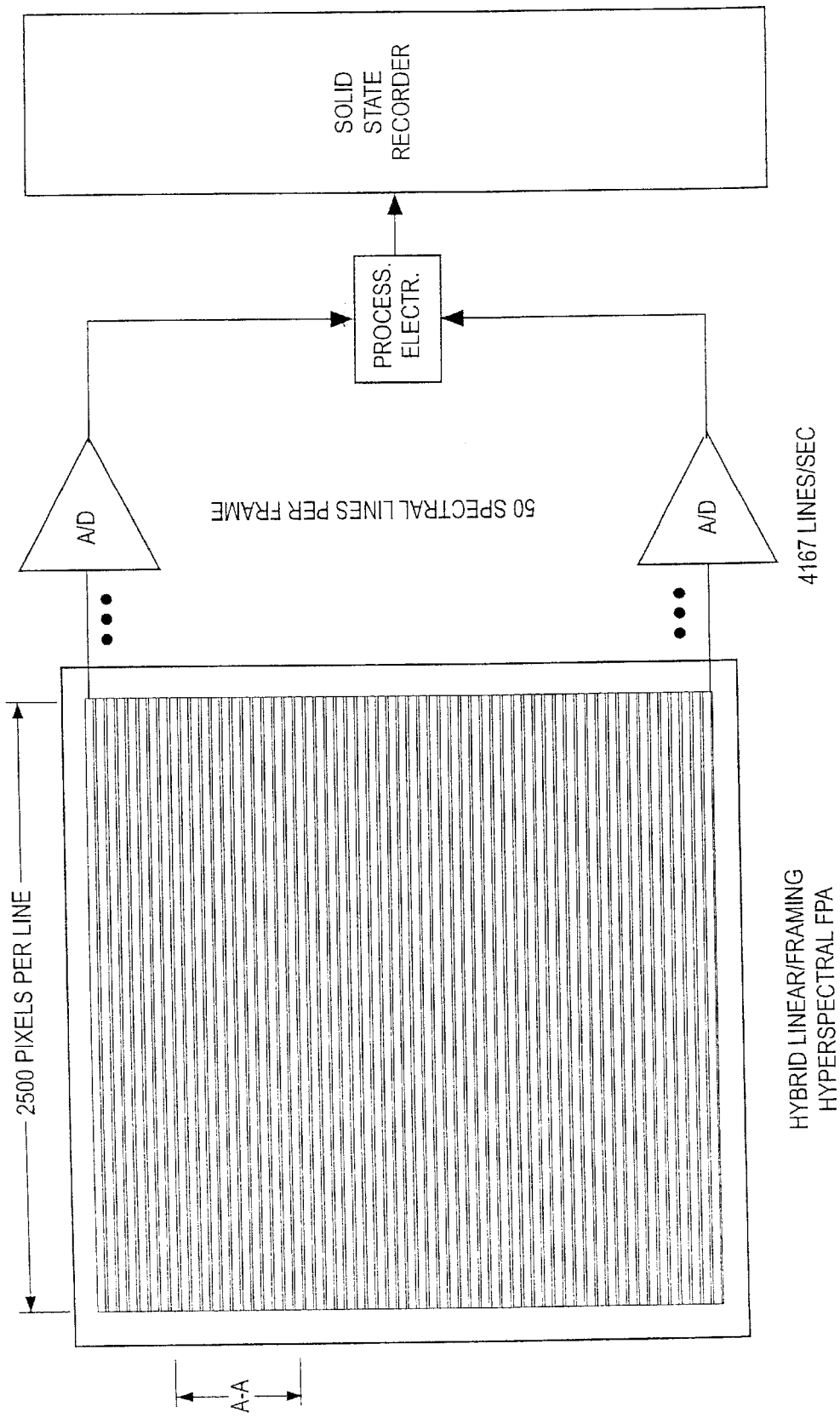
FIG. 7 shows a detail of the Framing Hyperspectral FPA substrate with the processing electronics shown schematically.

FIG. 7 shows a detail of the Framing Hyperspectral FPA substrate 44 with the processing electronics shown schematically and greatly simplified. The wafer scale FPA 44 is divided into thirty to fifty sub-arrays 60, with each sub-array 60 having its own readout channel electronically connected to an A/D converter 62. The A/D converter supplies digital image data to processing electronics module 63 and the data is then supplied to a solid-state recorder 64. Storage and signal processing can be accomplished via a variety of means known in the art, and such features, including the choice and design of signal processing circuitry, are not part of the novelty of this invention. However a solid state recorder 64 consisting of a large memory array is shown as typical for implementation of this invention due to its large storage capacity, instantaneous random access, high data bandwidth and simultaneous capability to read and write.

The FPA 44 is wafer scale sized and designed such that it includes rows and columns of pixels that are responsive to the spectral light energy of the band of interest. As shown, there are 2500 pixels across each sub-array, although, as discussed earlier, the number could vary dramatically from 1000 up to 9000 consistent with the present state of the art of 4- and 6-inch wafer scale processing.

The FPA is segmented vertically, in the scan direction, into multiple sub-arrays 60, with each sub-array comprising a two dimensional array consisting of N columns×M rows of pixels. In the preferred embodiment of the array there are thirty to fifty sub-arrays corresponding to thirty to fifty spectral bands of interest. In practice, the number of sub-arrays is limited only by the FPA material processing limits and the architectural constraints of the invention, as will be further disclosed. In the illustrated example, there may be between 40 and 200 rows of pixels in each sub-array in the vertical direction, and 2,500 pixels per row in the horizontal direction. These figures of course can vary. Forty-five rows of pixels in the vertical (TDI) direction is typical.

Figure 8:
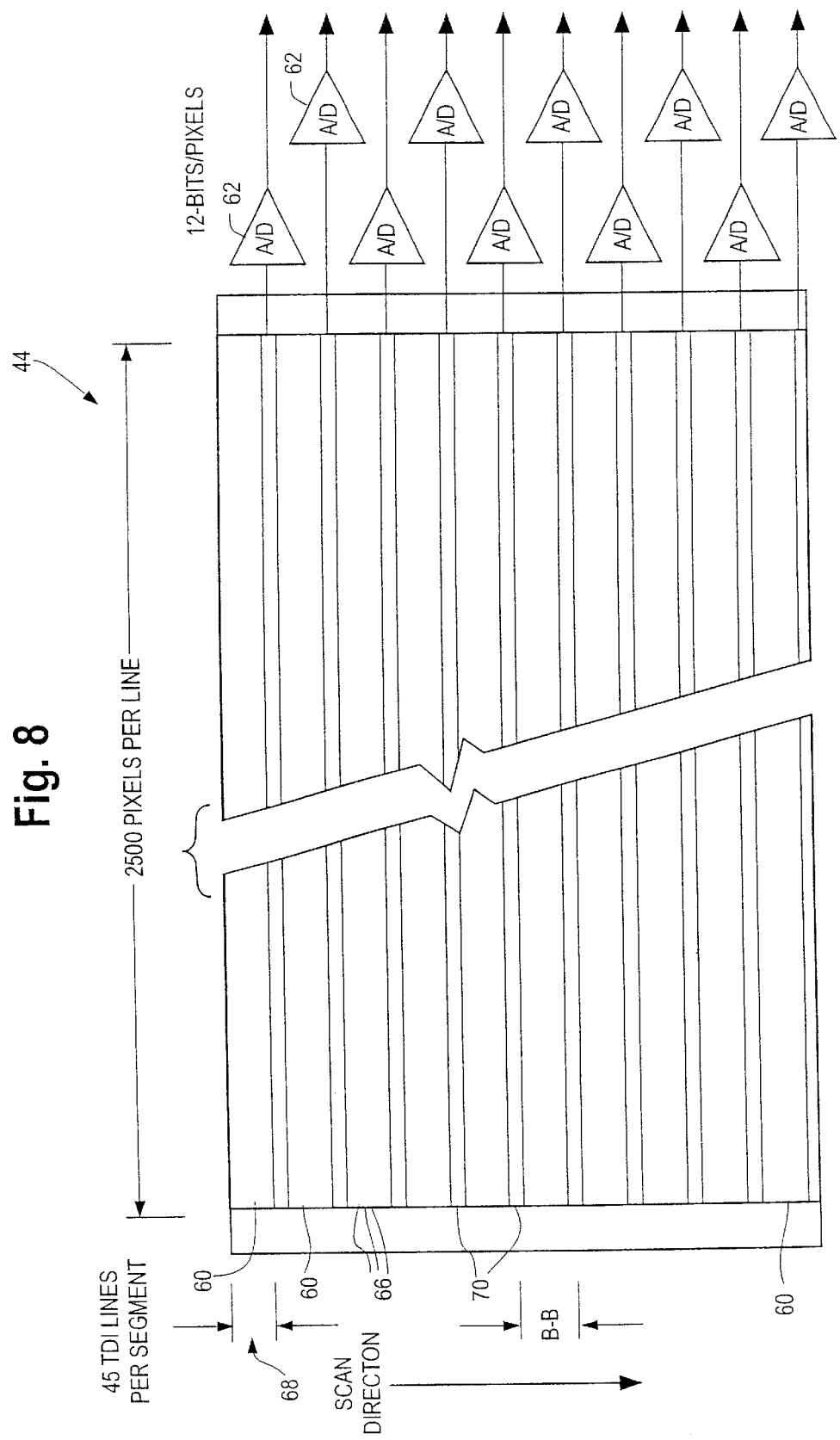
FIG. 8 is a more detailed plan view of the array substrate showing 10 sub-arrays.

Section A—A of the FPA of FIG. 7 is shown in further detail in FIG. 8. A section of ten sub-arrays 60 are shown, with each sub-array 60 shown schematically connected to an A/D converter 62 for output processing as discussed above. Each sub-array imaging matrix is shown with 2500 pixels per row with forty-five TDI lines 66 per sub-array 60 in the vertical direction, indicated at 68. The number of TDI lines 66 in practice can vary depending on the particulars of the application and is again only limited only by the physical size and processing technology of the material. Each sub-array 60 is separated by a read-out channel 70, whose width is kept at a minimum in order to maximize the useful imaging portion of the FPA real estate. Each readout channel is covered by a coating of aluminum or some other opaque material to prevent light energy from generating unwanted electrons within the readout registers of the sub-arrays.

Figure 9:
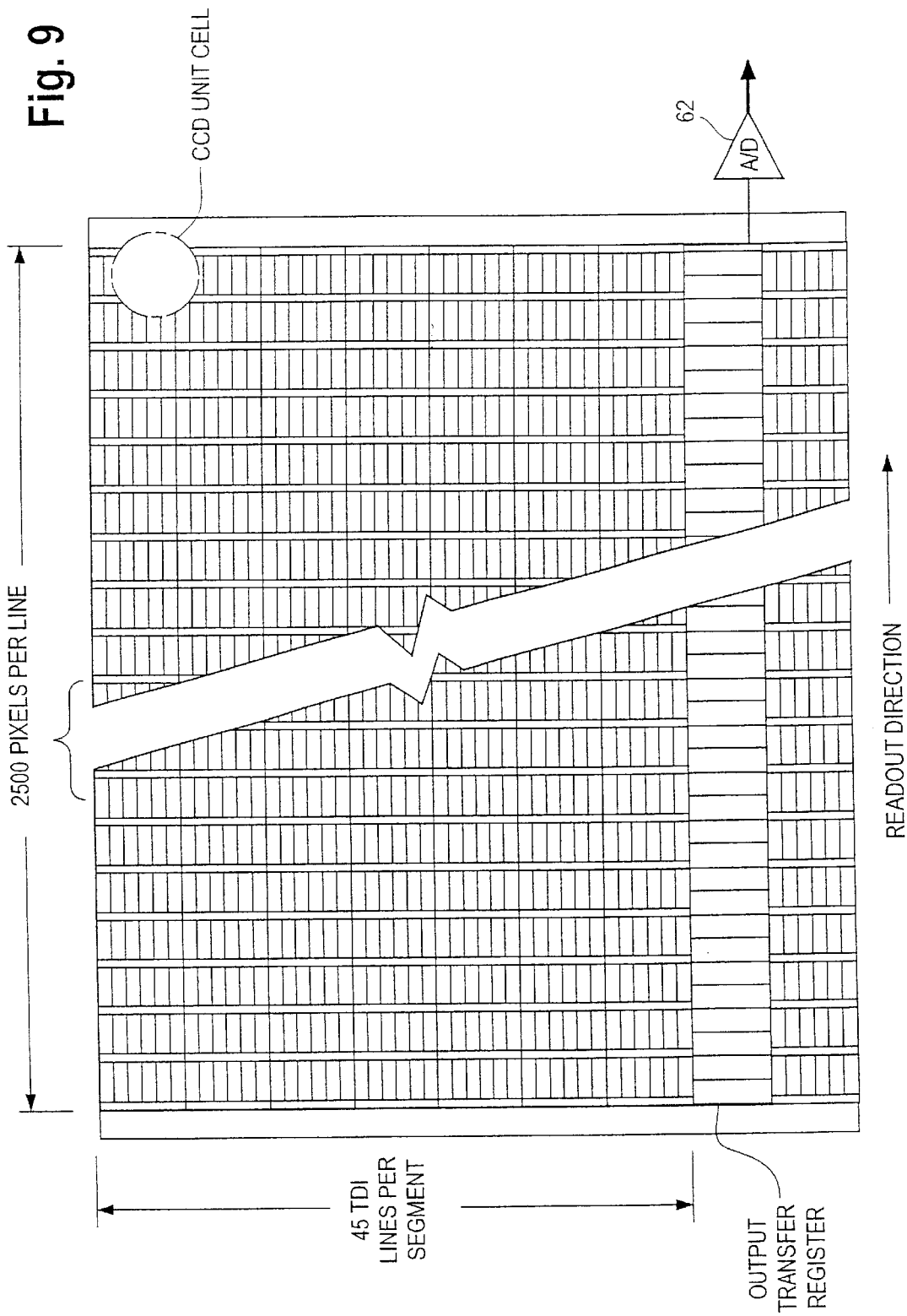
FIG. 9 is a more detailed plan view of one sub-array.

Still further detail of the architecture of the sub-arrays of the FPA is shown in FIG. 9, which is an expanded view of Section B—B of FIG. 8. Each row 66 within each sub-array 60 is a continuous line of pixels 74, separated by channel-stops 72 to prevent diffusion and cross-talk, which extends across the entire width of the light sensitive portion of the array. The preferred embodiment of the array has 2500 to 5000 pixels per line, but this again can vary according to the limits of silicon processing and wafer scale architecture constraints. For example, one row of a sub-array could contain 2500, 20-micron pixels for a total width of 50-mm. This is consistent with 4-inch silicon wafer processing. Another example is a sub-array with rows of 9000, 8.75-micron pixels for a total width of 80-mm, which is consistent with 6-in wafer processing. Obviously, many other combinations are possible. In other materials which are optimized for different imaging bands, such as Platinum Silicide (PtSi) or Indium Antimonide (InSb) for the Mid-wave IR (MWIR) band or the Short-wave IR (SWIR) band, or Mercury Cadmium Telluride (MCT) for the MWIR and Long Wave Infra Red (LWIR) bands, the pixel size may be even larger, such as 30- to 40-microns, with only 1500 to 2000 pixels per line, again consistent with wafer scale processing constraints.

As radiation from the scene is scanned onto the array 44, the line scan representing the scene moves in the vertical direction. The individual pixels in the columns of pixels are clocked in synchronism with the movement of the image in order to integrate (i.e., accumulate) the charge during the Time Delay and Integrate (TDI) period. At the end of the integration period the charge is read out to the output transfer register 70. The register 70 includes two separate registers 76 (FIG. 9) for each column of pixels, due to a two-phase clocking employed in the illustrated embodiment. The charge in the output transfer register 70 is sent to the A/D converter 62 and storage device for processing.

As shown in FIGS. 7–9, each sub-array 60 is manufactured with an equal number of TDI lines (e.g., forty five) to maximize the SNR within the imaging matrix. However, due to the nature of hyperspectral imaging one can use a priori knowledge of the spectral response of the CCD substrate to optimize system performance. Since the output of the spectral filter 42 of FIG. 4 will always project energy of a particular band to a particular portion of the array, it is contemplated that in operation each of the sub-arrays 60 are clocked to different TDI lengths within each sub-array to normalize and maximize the FPA response to the particular spectral illumination falling on that sub-array's imaging matrix. For example, the sub-array used for the detection of light with primarily blue content is clocked with more TDI rows in the column direction than one for light with red content, as silicon-based arrays tend to be more responsive to red than blue. Control of the TDI operation is effected by a digital clock generator. The clock generator is responsive to a computer that has stored TDI coefficients indicating the number of TDI rows to clock for each sub-array. These coefficients are determined at some time prior to actual hyperspectral imaging operation. The coefficients may be scaled linearly to account for exposure control. Control of charge transfer clocking signals to achieve TDI is well known in the art and further details are omitted from the present discussion for the sake of brevity.

A 2-phase output transfer register is shown in the illustrated embodiment of FIG. 9, with the width of the register limited to 40-microns, or 2-pixel widths. The register must be coated with an opaque material, such as aluminum or gold, and the width of the register must be sufficient to block radiation from adjacent filter segments from entering the imaging area. As a trade off, it is also desirable to minimize the width of the output channel for the obvious reason to maximize the imaging area of each sub-array and optimize overall performance in terms of signal to noise ratio or the number of hyperspectral channels.

Wide latitude is possible in the choice or design of the structure and architecture of the readout register 70, output transfer gates and drains, etc. Those skilled in the art will realize that the primary consideration is that the output transfer register 70 must have the capacity to store and transfer the accumulated charge of the TDI registers without inducing unwanted effects such as blooming or blurring due to low charge transfer efficiency. As such, a two-phase readout architecture is shown, but obviously other architectures can be used.

Figure 10:
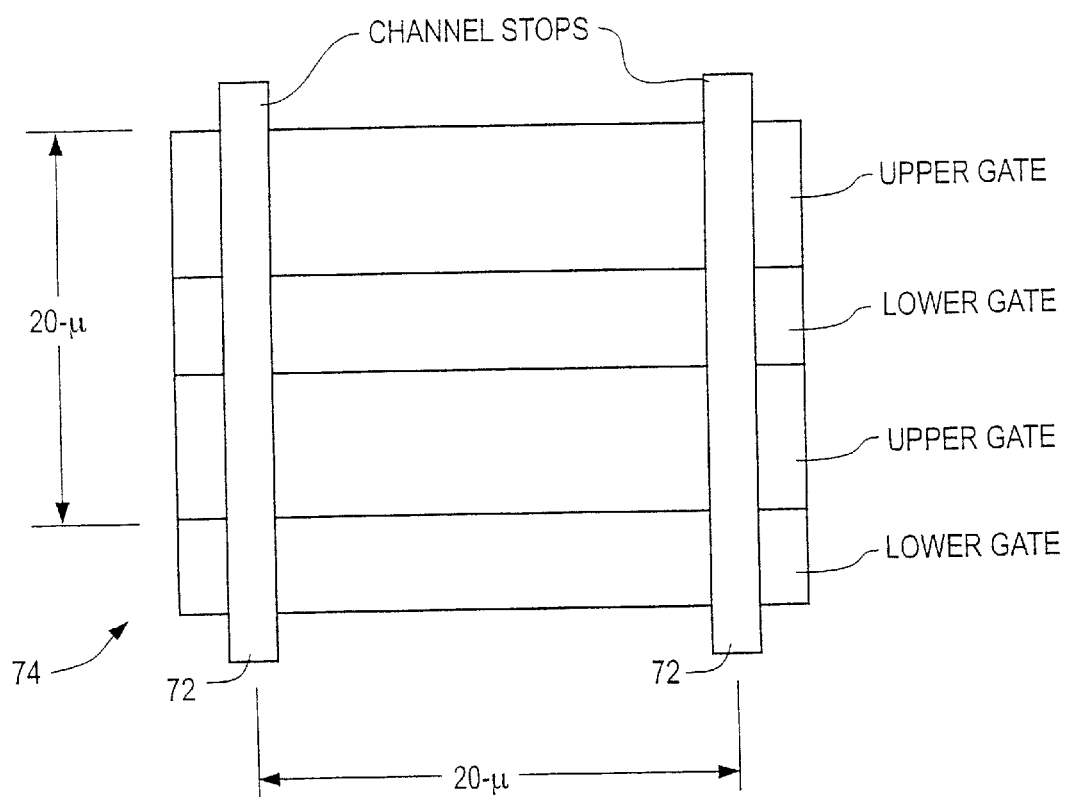
FIG. 10 is a plan view of one unit cell or pixel of the array.

The preferred embodiment of the CCD unit cell or pixel 74 for the hyperspectral sub-array is shown in FIG. 10. Each pixel 74 of the array is approximately square in shape with dimensions on the order of 20-microns per side in the preferred embodiment. The preferred embodiment is shown as a 3-phase device with channel stops 1½ to 3-micron in width separating the imaging and storage area of each unit cell. Those familiar with the art will recognize immediately that other unit cell architectures, such as a 4-phase, 2-phase or ripple-clock architecture, will perform equally as well and the extent of claims for this invention should not be limited in that regard. Also, at the discretion of the device designer considering the demands of the particular application, the channel stops 72 could be used to interconnect clock signals via polysilicon or metal, as can be the region over the output transfer register.

Figure 11:
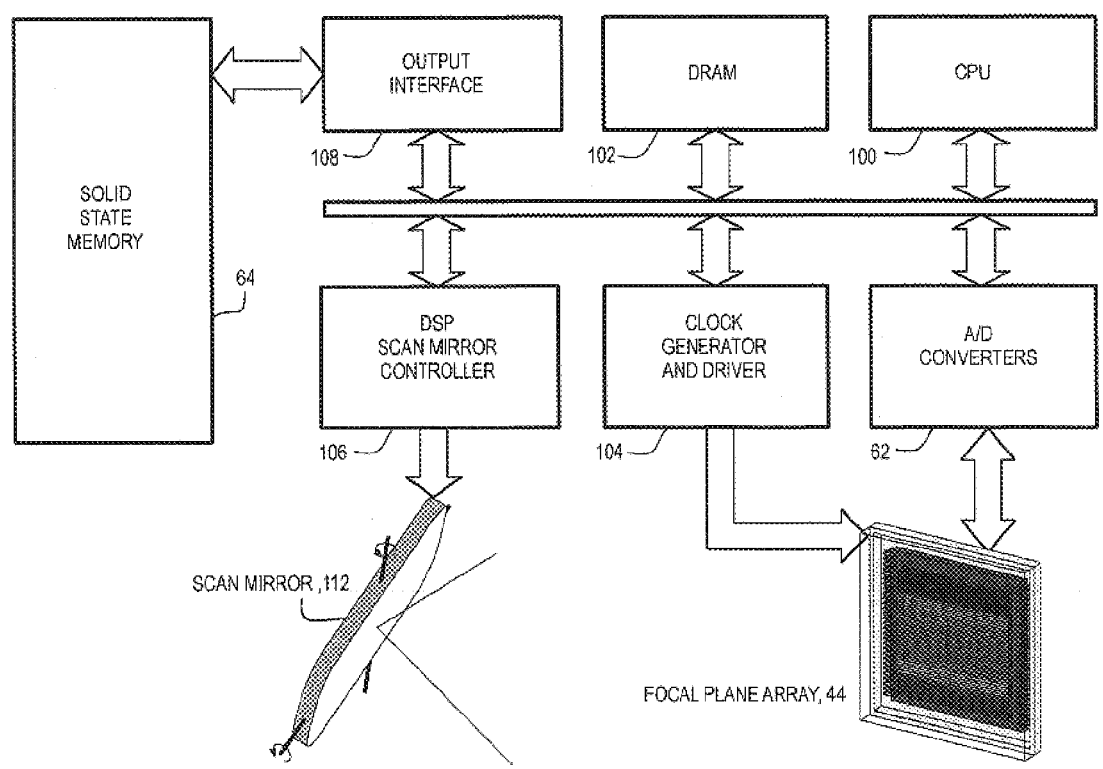
FIG. 11 is a functional block diagram of the preferred embodiment of a Hyperspectral system employing the spectral imaging FPA as disclosed.

FIG. 11 is a functional block diagram of the preferred embodiment of a Hyperspectral system employing the spectral imaging FPA as disclosed. The system is configured about a typical microprocessor architecture that includes a CPU 100, memory (DRAM) 102 for control software and image data, a clock generator and driver 104, a Digital Signal Processing (DSP) controller 106 for the scan mirror and an output interface 108 to an external image storage media 64 that is shown as a Solid State Memory. All of these elements are connected to a control bus 110 that transfers address, control and image data between the functional blocks. As would be required for any FPA based imaging system, the clock generator 104 generates a series of clock signals necessary to move the signal charge through the various gates in the sub-arrays of the FPA in coordination with the movement of the scan mirror 112. A clock driver is employed to bias these to the appropriate voltage levels for the FPA to operate correctly. As discussed above, the analog output signals from each sub-array of the FPA are converted to digital values by a number of A/D converters 62, one for each sub-array, contained on an A/D converter board.

The DSP controller 106 positions and moves the scan mirror at the appropriate rate such that the image movement due to scanning across the line of flight is synchronized with the TDI clock movement within each sub-array of the FPA 44. Control software translates mission flight plans and control panel inputs into pointing positions for the scan mirror 112. Aircraft data, such as altitude, velocity and position, are used to compute the rate of movement of the scan mirror to keep the image points on the ground tracking within the TDI sections of each sub array. A software control program is employed to maintain overall synchronization of the FPA clocking and the scan mirror movement. Such programs can be readily developed by persons skilled in this art. Forward motion compensation can be provided by the scan mirror, by a prism, or by many other forward motion compensation devices known in the prior art. Alternatively, two axis image motion compensation can be implemented with the FPA "on-chip" to provide both TDI motion due to scanning in the cross-line of flight and forward motion compensation due to forward motion of the aircraft relative to the scene.

It will be appreciated that the architecture disclosed herein of a hyperspectral or multispectral sub-array within a large area wafer scale FPA is not limited to Silicon as a material or the Charge Couple Device (CCD) as a detector technique. For example, the invention could be embodied equally well in an FPA fabricated from Mercury Cadmium Telluride (MCT) detector material, which is responsive to IR radiation. Furthermore, a CMOS detector technique or hybrid CMOS FPA with the detector material bonded to a CMOS readout architecture could also be employed. Furthermore, the A/D converters 62 and portions of the processing electronics 63 could also be contained within the CMOS architecture. Details regarding the general operation of TDI or the general nature and manufacturing of CCD array devices or the conversion, storage and transfer of electronic charges with the unit cells of such arrays are all subjects that are known to persons skilled in the art and are omitted from the present discussion for the sake of brevity. Such teachings can be found and applied from the extensive prior art referenced previously in this document.

The use of contiguous sub-arrays on a monolithic FPA as disclosed in the principal embodiment avoids the loss of spectral energy that would be inherent in an array of mechanically or optically abutted arrays.

A second alternative embodiment of this invention is disclosed which takes maximum advantage of the surface area of a silicon detector array to maximize the number of hyperspectral bands detected by varying the number of TDI columns for each of the sub-arrays according to the a priori knowledge of the spectral response of the Silicon detector material used in the fabrication of the array. Creating sub-arrays with shorter TDI columns in the higher responsivity wavelengths serves to vary the length of the columns of each sub array so as to normalize the signal response of the array to the spectral information and maximize the number of hyperspectral bands detected. Shortening the physical length of the TDI columns for some of the sub-arrays does not limit the user to clocking those sub-arrays to less TDI required according to the first embodiment of the invention.

A third alternative embodiment of the invention varies the TDI coefficients, that is, the number of pixels through which the charge is shifted in a TDI column in each of the sub-arrays, dynamically to allow for global changes in the spectral content of the target image, such as might be encountered when changing the depression angle from a highly oblique to one near nadir (directly below the aircraft). As the depression angle is varied, the amount of atmosphere through which the image travels and thus the overall spectral content of the image can vary by a factor of three to five. By dynamically changing the TDI profile with changing depression angle, the signal levels within each of the sub-arrays can be maximized.

A fourth and further alternative embodiment of the invention includes the use of two dimensional charge shifting to account for image motion during the TDI process to eliminate motion blur and preserve image quality. During the TDI operation in the vertical pixel columns, rows of pixels are shifted horizontally at a rate predetermined by the aircraft imaging parameters. The shifting of the pixels in the in-line-of-flight direction during the imaging process eliminates the image motion that occurs during the TDI integration time. It is a novel feature of one aspect of this invention that different motion compensation rates can be used in different image bands of the array to accommodate different relative motions created by the aircraft imaging parameters. This embodiment has the additional novel advantage that the target perspective can be held constant during the imaging process. This improves the performance of hyperspectral target detection. Spectral images that are recorded from moving vehicles suffer from a distortion in the image cube due to the changing aspect ratio and target perspective obtained during the image collection process. Two-dimensional motion compensation eliminates this distortion and therefore presents a substantial improvement of the image cube data. Additional information regarding the design and implementation of an imaging array with bi-directional charge transfer can be found in U.S. Pat. No. 5,798,786 to Lareau et al., the content of which is incorporated by reference herein.

A fifth embodiment of the invention utilizes independent clocking control of specific TDI sub-arrays to provide enhancement in a specific spectral band or group of bands. For example, for some targets, certain specific spectral bands are associated with specific targets (such as particular bands associated with the emissions from a chemical weapons plant), and the array is programmed or designed to increase the signal collection (number of rows of TDI clocking) for those sub-arrays imaging in the portions of the spectrum corresponding to these targets, perhaps at the expense of other portions of the array. The purpose of this embodiment is to increase the ability of the array to detect targets with a characteristic spectral signature. The incident energy may be more efficiently collected in the spectral regions of known targets using this technique. In other words, the capability may be used to locate targets exhibiting certain spectral attributes. These attributes are designed to be imaged with greater signal collection by increasing the number of TDI rows for those sub-arrays associated with these spectral bands. Ideally, the array is dynamically programmable to vary the designation of sub-arrays that are subject to independent clocking control, so that the array can adapt to changing targeting requirements in a reconnaissance mission. In this embodiment, it might be possible to not even clock some of the sub-arrays so that energy is only collected in the spectral bands of interest corresponding to the desired target's spectral signature. The process could screen for targets based on the spectral signature. Only those sub-arrays in the spectral bands of interest would be read out and processed, allowing for faster sensor operation.

Scan Operation

Figure 13:
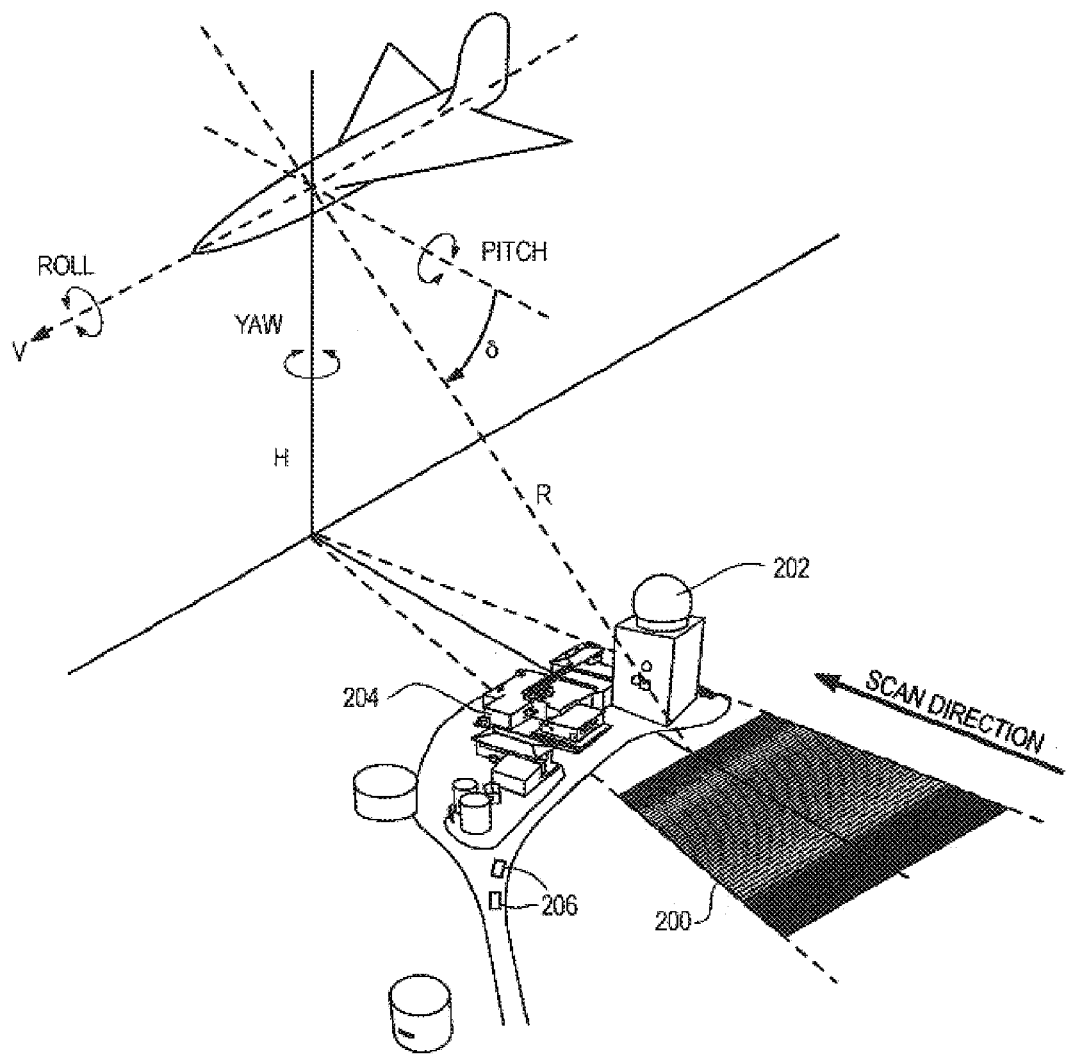
FIGS. 13–15 show the start, center and end of a single scan operation, in which each portion of the terrain of interest is imaged at all parts of the spectrum as the scan moves across any point in the field of view.
Figure 14:
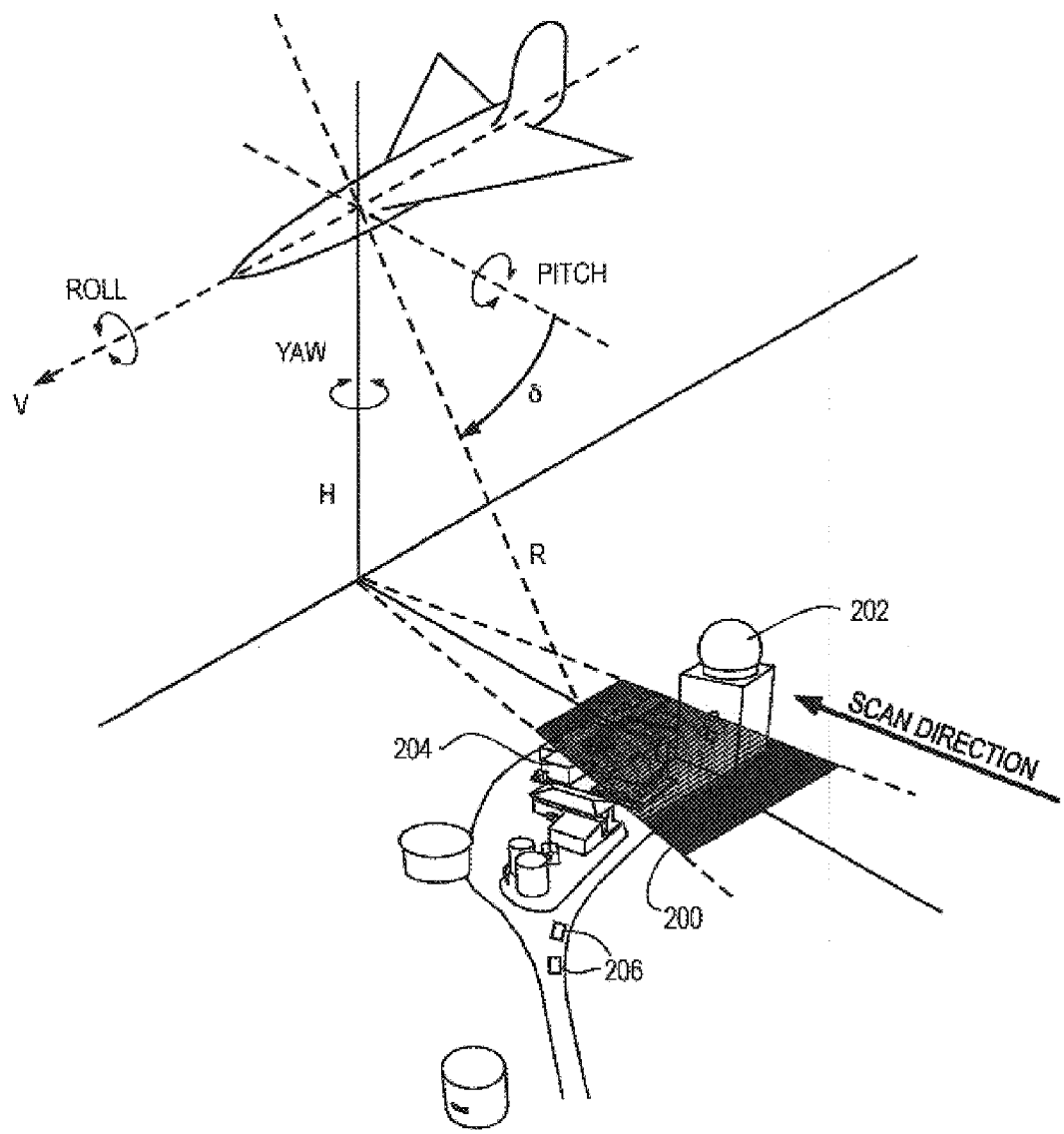
Figure 15:
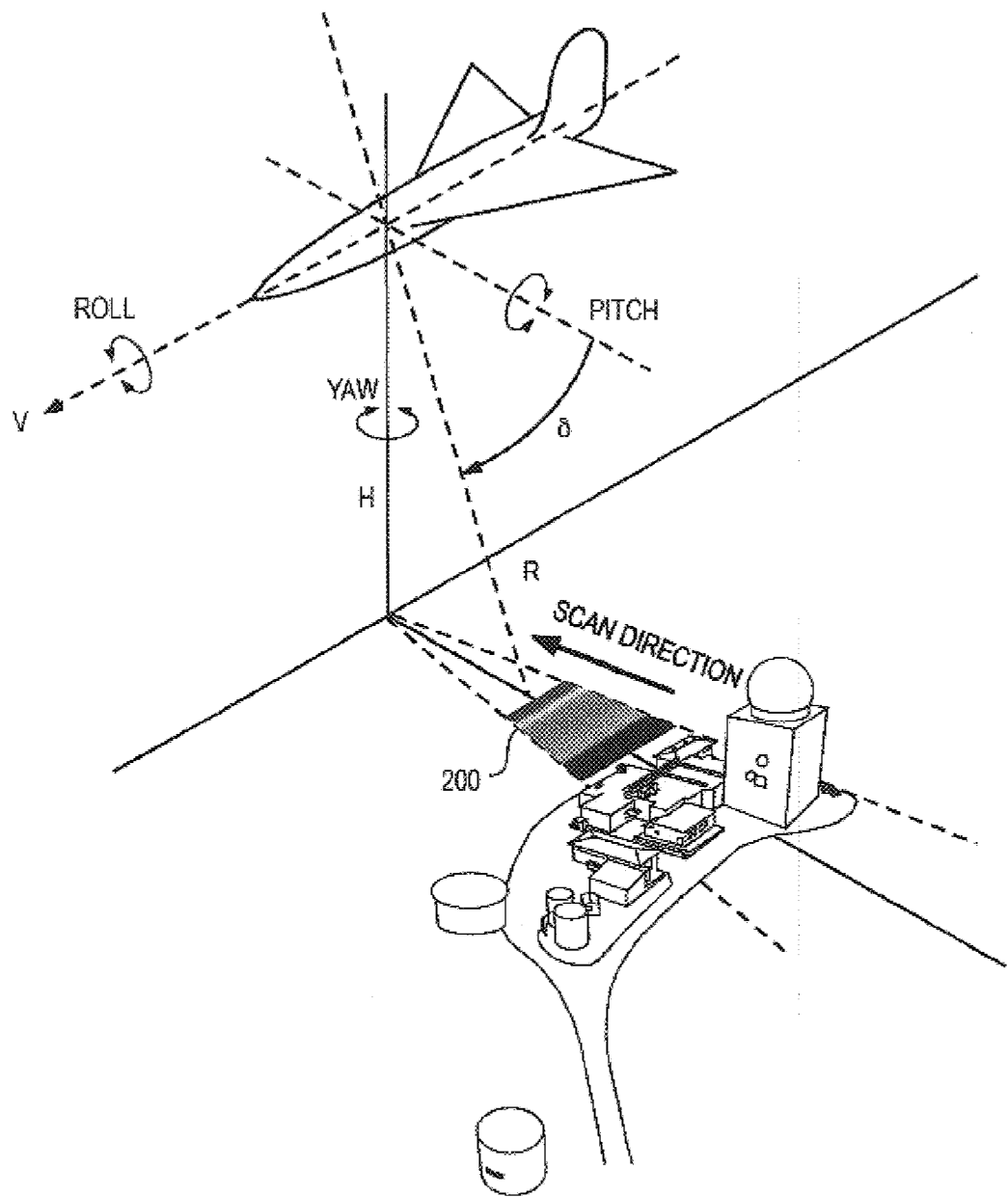

The operation of the preferred embodiment is shown in FIGS. 13–15. As described in FIG. 2 above, a side oblique mission scenario is shown with typical aircraft parameters assumed for altitude, H aircraft velocity, V depression angle, δ, and the resulting slant range to the target, R. The segmented spectral filter and array is assumed mounted in a camera system configuration using a primary lens and scan mirror as described in FIG. 3, all enclosed in a camera body which provides mechanical rigidity and optical alignment, etc., as would be typically found in a reconnaissance camera known in the art. See, for example, FIG. 5 of U.S. Pat. No. 5,668,593, Method and Camera System for Step Frame Reconnaissance with Motion Compensation, by Lareau, et al.

In order to clarify the description of the operational sequence of events, FIG. 13 shows a projection of the spectral filter of the FPA as if it is emanating from the camera onto the ground in order to show the area covered by each of the filtered sub-arrays of the FPA. Note that at the start of the exposure the entire array is exposed, each sub-array images a different portion of the terrain of interest, and images in a different portion of the spectrum. The trapezoidal shape 200 shown is the typical result from a side oblique imaging configuration. This represents area covered by the entire FPA with each color representing the instantaneous area of coverage for each sub-array of the FPA. The objective is to image each point of the target area such that the radome 202, buildings 204 and vehicles 206 within the target scene are imaged by each sub-array of the FPA, and thus each filtered spectrum.

Figure 16:
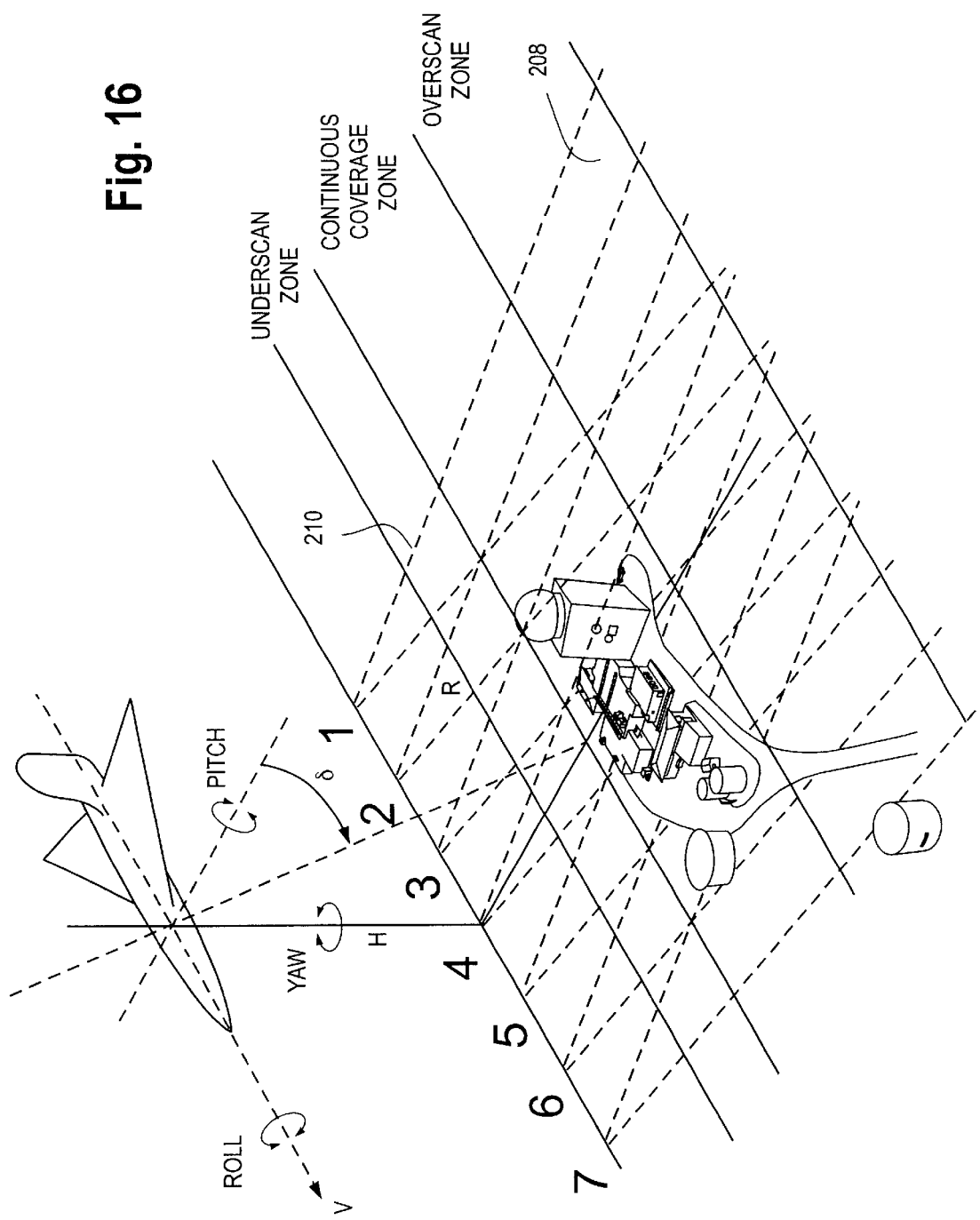
FIG. 16 is an illustration of the hyperspectral scan coverage as the aircraft of FIGS. 13–15 flies past a scene of interest, showing the coverage of several scan cycles.

To accomplish this, the scanning device (scan mirror 112 of FIG. 11) of the camera scans the image across the FPA as the plane flies forward. FIGS. 14 and 15 show the effect of this conceptually as the ground projection of the FPA is scanned towards nadir across the target area. Of course, in all practicality, this operation could take place in the opposite direction or in a bi-directional mode, all of which should be considered within the scope of this invention. FIG. 16 shows the net effect of this scanning process where in it can easily be seen that after seven complete scans there is a desired area of continuous zone coverage surrounded by overscan and underscan zones 208 and 210. These over- and underscan zones 208 and 210 are an inefficiency associated with this method of hyperspectral image capture and good design practice should be used to minimize this effect.

Although this method of hyperspectral imaging does not provide complete and exact temporal simultaneity in the spectral measurements and introduces spatial misregistration, since any give point of the scene will be imaged at a different position due to forward motion of the aircraft, the significant increase in coverage area obtained with this technique more than offsets these characteristics. The feature of wide area coverage provides a most needed advantage for reconnaissance missions.

In the final analysis, the lack of temporal simultaneity in the acquisition of spectral information in every band, and lack of exact spatial registration among the bands, is an acceptable tradeoff in many tactical reconnaissance applications. In such applications, there is a great need for hyperspectral images having wide area coverage and with a high signal to noise ratio. The preferred embodiments described above meets these objectives very well.

Comparative Performance Analysis for Representative SWIR Hyperspectral Embodiments A comparative performance analysis is set forth below which shows the significant improvement in area coverage provided by a hyperspectral camera system in accordance with the preferred embodiment of the invention, as compared to a reference hyperspectral system that represents the state of the art today, that is, an improvement over the Dark Horse example described previously. The system constraints in this comparative performance analysis are defined by the parameters of a Recon/Optical Inc. LOROP camera currently in production. The reference system is defined by the system constraints set forth below. The reference camera for this analysis is configured as a hyperspectral system representative of the current state of the art that incorporates an imaging spectrometer operating in the Short Wave Infrared spectrum (SWIR).

The area coverage for this reference system is 235 nmi$^2$ per hour. This coverage can be analogized to looking at the terrain through a soda straw. The improved performance exemplified by the present invention is presented in Table 1 below for comparison. It will be noted that the improvement in area coverage for the system of the present invention is over one order of magnitude better than the reference system, that is, between roughly 3000 and 9000 nmi$^{-2}$ per hour, depending on the exact configuration of the FPA. Also, it is roughly two orders of magnitude greater than the Dark Horse example set forth previously. Thus, the present invention generates imagery covering between 12.7 and 38.3 times as much area on the ground in the same amount of time as compared to the reference "soda straw" hyperspectral system. This dramatic increase in area coverage has several immediate and significant benefits relative to the prior art:

1) Since more terrain is covered in a given amount of time, the total exposure of the aircraft to hostile fire while imaging the terrain of interest is dramatically reduced.
2) The system generates imagery in a wider area, allowing the target area to be imaged with greater reference to surrounding terrain and therefore make it easier to find the target.
3) The larger aerial coverage provided by the system makes it much easier to image moving targets, since the imagery will be more likely to include the target as it moves about the scene.

The system constraints common to both the reference camera and the present invention include an f/2.4 lens with a focal length of 30-in, a 1000-pixel by 1000-pixel, 15-millimeter wide Mercury Cadmium Telluride (HCT) focal plane array (FPA) detector optimized for 75% quantum efficiency (QE) in the SWIR Band, and several operational parameters such as detector integration time and a number of channels typical for current state of the art hyperspectral cameras. The FPA architecture in the reference camera is configured as a standard area array, whereas the FPA of the subject invention is configured with sub-arrays operating in the TDI mode according to the description of the preferred embodiment of the present invention. It is acknowledged that other reconnaissance cameras, other detectors, other spectral wavelength bands, and other configurations can be used and that this is but one example of a configuration that yields a dramatic improvement in area coverage based on the preferred embodiment. One skilled in the art of engineering reconnaissance systems will readily recognize the equations and relationships given below that describe how the improvement in performance is achieved.

The camera and detector parameters defined as constants in this comparative performance analysis are as follows:

The focal length of the camera in inches, fl=30 in.

The f number of the camera lens, $f_{no}$=2.4

The number of hyperspectral channels desired, N=30

The Quantum Efficiency of the detector array, QE=75%

The assumed width of the detector readout and clocking regions per channel in millimeters (mm) consistent with that found in the existing art, $W_r$=0.05 mm.

The number of pixels in the detector=1000×1000=1,000,000.

The retrace time in seconds per scan based on prior art systems, $t_R$=0.4 sec.

Nominal integration time in seconds, based on a prior art configuration, $t_{int}$=0.0072 sec.

The imaging parameters defined as constants in this analysis are:

Aircraft altitude, H=25,000 feet

Aircraft velocity, V=600 knots

These are typical in the art of tactical reconnaissance.

The camera and detector parameters used as independent variables in this analysis are:

Detector pitch or pixel dimension in micrometers, $P_{XLOF}$= 18 microns, (select 18, 24 or 30)

Detector FPA dimensions in millimeters are as follows:

Cross Line of Flight, $S_{XLOF}$=15 mm, (select 15, 20, 25, 30 or 35)

In Line of Flight, $S_{iLOF}$, where $S_{iLOF}$=$S_{XLOF}$ for square pixels

The following conversion factors are used:

25.4 millimeters/inch 3.2808 feet/meter 6076 feet/nautical mile (nmi)

The following detector parameters are calculated based on the constants defined above:

The number of pixels per line In Line of Flight (ILOF), $$L = \frac{S_{iLOF}}{P_{XLOF}}$$

The angular pixel subtense in radians, $$\alpha = \frac{P_{XLOF}}{fl * 25.4}$$

The number of TDI rows used per channel Cross Line of Flight, $$TDI = \frac{\frac{S_{XLOF}}{N} - Wr}{P_{XLOF}}$$

Since this must be an integer number, the actual size of the FPA in radians is:

$$W_{FPA} = N * \left[ \frac{TDI * P_{XLOF} + Wr}{fl * 25.4} \right]$$

The integration time must be adjusted to keep an equivalent signal level at the focal plane due to changing the detector pitch or changing the number of channels. As the detector pitch is increased, the photon flux collected from the detected signal is increased. Therefore, the integration time should be decreased proportionately. A first order linear relationship exists between the number of channels and the total flux over any one TDI sector. Given a nominal integration time for a 50-channel system, as the number of channels is decreased, the integration time can be decreased because it is assumed that each channel bandwidth is increased allowing proportionately more energy through the filter to the array.

The area factor relative to a system with an 18 micron detector pitch is:

$$Area_{factor} = \left[\frac{P_{XLOF}}{18}\right]^2$$

The channel factor relative to a 50-channel system is:

$$Channel_{factor} = \frac{N}{50}$$

Assuming the QE and lens f number stay constant, the nominal integration time for the system, $t_{int}$, is adjusted to the new integration time $t_{intnew}$, as follows:

$$t_{intnew} = \frac{t_{int} * Channel_{factor}}{Area_{factor}}$$

Knowing the number of TDI rows and the adjusted integration time and the pixel angular sub-tense, the maximum scan rate, $\omega_s$, of the system is determined as:

$$\omega_S = \frac{\alpha * TDI}{t_{intnew}}$$

which must be kept within the limits of the camera system capabilities.

For the purpose of this analysis and keeping within stated user requirements, it is assumed that the worst acceptable resolution in terms of the Ground Sample Dimension (GSD) perpendicular to the line of flight is specified at 1 meter. The depression angle of the sensor at which the GSD is limited to 1-meter is:

$$Delta = \sin^{-1}\left[\frac{\alpha * H}{3.2808}\right]$$

Based on this limiting depression angle, an initial cycle time is calculated as:

$$T_{cycle} = \frac{\alpha * H * L}{\sin(Delta) * V}$$

An iterative analysis can now be used to calculate the optimum depression angle at which to end scanning which will yield the maximum XLOF Field of View (FOV), not exceed 1-m GSD, and give continuous coverage. In this analysis, the scanning is presumed to start at a maximum camera depression angle and scan upward, opposite to the sequence of scanning shown in FIGS. 13–15. This iterative analysis could be done manually but is most easily accomplished by one skilled in the art using a variety of commercially available computational software tools, such as Matlab or MathCAD. For the purpose of these teachings an analysis in MathCAD, V 8.0 is given. (See MathCAD User's Guide, available from MathSoft, Inc., 101 Main Street, Cambridge Mass. 02142) Repeated or iterative calculations are accomplished using a special variable called a "range variable". For the purpose of this analysis, the range variable, i, is selected to vary between 1 and 50, representing the 50 iterations of the computation. Variables $\gamma_i$ and $t_{cy_i}$ represent the iterative depression angle and cycle time with the initial values for these variables set at the limiting depression angle, Delta, established above and its associated cycle time, $t_{cycle}$. For each increment of the range variable, i, the new value of the depression angle, $\gamma_{i+1}$, is recalculated by adding an incremental amount based upon the current value of the cycle time, $t_{cy_i}$. And the new value of the cycle time $t_{cy_{i+1}}$ is recalculated based upon the current value of the depression angle, $\gamma_i$. Limit testing is done to ensure that the depression angle stays between the limits defined by the GSD calculation and 90-deg (NADIR). The results of the iterative MathCAD analysis are shown below for the initial conditions described above. For clarity and brevity only the last set of iterative calculations are shown.

$$i = 1 \ldots 50$$

$$\begin{vmatrix} \gamma_0 \\ t_{cy0} \end{vmatrix} = \begin{vmatrix} Delta \\ t_{cycle} - t_R \end{vmatrix}$$

$$\begin{vmatrix} \gamma_{i+1} \\ t_{cy(i+1)} \end{vmatrix} = \begin{vmatrix} \text{if } \{(\gamma_i - W_{FPA}) < 90°, Delta + \omega_s * t_{cy(i)}, 90°\} \\ \frac{\alpha * H * R}{V * \sin(\gamma_1 - W_{FPA})} - t_R \end{vmatrix}$$

The results of the iterative calculations are as follows:

| i = | γi | tcy |
|---|---|---|
| 38 | .67 | 1.011 |
| 39 | .67 | 1.012 |
| 40 | .656 | .978 |
| 41 | .656 | 1.005 |
| 42 | .668 | 1.005 |
| 43 | .668 | .983 |
| 44 | .658 | .983 |
| 45 | .658 | 1.001 |
| 46 | .666 | 1.001 |
| 47 | .666 | .987 |
| 48 | .66 | .986 |
| 49 | .66 | .998 |
| 50 | .665 | .998 |

Note that after about 46 iterations the value of γi settles. The value of γi gives the optimum depression angle for starting the scan, in radians, measured above nadir. $\Phi = \gamma_{50} - W_{FPA}$ is the starting depression angle that will yield the maximum XLOF FOV, not to exceed 1-meter GSD and give continuous coverage. The cycle time is recalculated for the determined depression angle, and the final mission parameters are calculated:

$$t_{cycle} = \frac{\alpha * H}{\sin(\phi)} * \frac{L}{V}$$

$$Delta = \gamma_{50} - \omega_s * t_{cy50}$$

$$XLOF = \frac{H}{\tan(Delta)} - \frac{H}{\tan(\phi)} \quad \text{(this result is feet in the XLOF direction, in feet)}$$

$$Area = V * XLOF * \frac{3600}{6076^2} \quad \text{(this result is in square nautical miles)}$$

-continued $$\text{Max Depression} = \frac{H}{6076 * \tan(\phi)}$$

$$\text{Coverage Limit} = \frac{H}{6076 * \tan(\text{Delta})}$$

Table 1 shows the results for three different HCT wafer sizes between 15-mm and 35-mmm and with the pixel size varying from 18 to 30-micron, thus illustrating the results for various possible array configurations for a camera in accordance with this invention. The comparative analysis shows that the area coverage ranges from 3400- to over 9000-nmi$^2$/hr for the various permutations of the camera configuration, which is a substantial improvement over present capabilities. The area coverage for one case is shown graphically in FIG. 17 and discussed below.

current technology, and has an integration time of 2.46 ms, which allows for good light collection even in low illumination scenarios. Thus, an FPA with these parameters would be a good candidate for a SWIR hyperspectral FPA with 30 hyperspectral channels in accordance with one possible embodiment.

The area coverage for the example of an FPA with 24 micron pixel size, 25 mm wafer dimension, and 30 hyperspectral channels with the scanning according to FIGS. 13–15 is shown in FIG. 17. FIG. 17 is a plot showing the area coverage 300 in a single scan from an initial camera depression angle of 36.2 degrees, and scanning up away from nadir to a maximum depression angle Delta max. The maximum depression angle Delta max is determined by the need to meet the GSD objective of 1 meter for terrain imaged at this depression angle, and can be derived from the parameters in Table 1. The X- axis of the plot shows the

TABLE 1

HCT SWIR Performance Analysis
Major Assumptions: Reconnaissance camera format
30-in Focal Length
30 Hyperspectral Channels
H = 25-Kft, V = 600-kn

| Square pixels | HCT Wafer Dimension | | | | |
|---|---|---|---|---|---|
| | 15-mm | 20-mm | 25-mm | 30-mm | 35-mm |
| | Pixel Size =18-micron | | | | |
| Pixels per Line (row) of FPA | 833 | 1111 | 1389 | 1667 | 1944 |
| Area Coverage (nmi$^2$/hr) | 5973 | 7476 | 8241 | 8532 | 9032 |
| No. of TDI rows per sub-array | 25 | 34 | 44 | 53 | 62 |
| Depression Angle @ Max | 18.35 | 22.79 | 27.54 | 32.55 | 37.52 |
| Scan Rate (deg/sec) | 7.832 | 10.733 | 13.634 | 16.535 | 19.436 |
| Channel Data Rate (Mp/s)* | 4.82 | 8.81 | 13.99 | 20.37 | 27.92 |
| Integration Time (ms) | 4.32 | 4.29 | 4.37 | 4.34 | 4.32 |
| | Pixel Size = 24-micron | | | | |
| Pixels per Line (row) of FPA | 625 | 833 | 1042 | 1250 | 1458 |
| Area Coverage (nmi$^2$/hr) | 4390 | 5587 | 6365 | 7264 | 7847 |
| No. of TDI rows per sub-array | 19 | 26 | 3340 | 40 | 47 |
| Depression Angle @ Max | 24.02 | 29.91 | 36.2 | 42.57 | 49.5 |
| Scan Rate (deg/sec) | 13.924 | 19.081 | 24.239 | 29.396 | 34.5 |
| Channel Data Rate (Mp/s)* | 4.82 | 8.81 | 14.00 | 20.36 | 27.87 |
| Integration Time (ms) | 2.46 | 2.46 | 2.46 (FIG. 17) | 2.46 | 2.46 |
| | Pixel Size = 30-micron | | | | |
| Pixels per Line (row) of FPA | 500 | 667 | 833 | 1000 | 1167 |
| Area Coverage (nmi$^2$/hr) | 3429 | 4463 | 5244 | 5923 | 6504 |
| No. of TDI rows per sub-array | 15 | 21 | 26 | 32 | 37 |
| Depression Angle @ Max | 29.42 | 36.77 | 44.69 | 53.26 | 62.88 |
| Scan Rate (deg/sec) | 21.76 | 29.82 | 37.87 | 45.93 | 53.989 |
| Channel Data Rate (Mp/s)* | 4.82 | 8.82 | 13.98 | 20.36 | 27.93 |
| Integration Time (ms) | 1.55 | 1.59 | 1.55 | 1.57 | 1.55 |

* Compare to 7.938-Mp/s for Reference FPA
Notes:
1.) Assume 1-M GSD Resolution Limit
2.) The calculated area coverage for the reference Hyperspectral system is 235-nmi$^2$/Hr From the results in Table 1, it will be seen that tradeoffs in scene coverage, data rate, and scan rate must be made to arrive at a particular camera configuration that works best for any given reconnaissance scenario. The example of a 24 micron pixel size, and 25 mm wafer dimension, is one possible choice. The area coverage provided by the camera in the scanning mode shown in FIGS. 13–16 is shown in FIG. 17 and described below. This particular embodiment has an area coverage of 6,365 nm$^2$ per hour (roughly 27 times better than the reference system), a channel data rate of 14 million pixels per second, which is acceptable given in-line of flight distance, in units of feet, with 0 set as nadir at the time the camera starts the scanning operation. The Y-axis of the plot shows the XLOF distance, in units of nautical miles. The projection of the top edge of the FPA on the ground is indicated by line 303 at the start of the scan and at line 303' at the end of the scan. The projection of the bottom edge of the FPA on the ground is indicated by the line 305 at the start and at 305' at the end of the scan.

As the scanning starts and the aircraft moves forward at 1000 ft per second, the scanning operations goes from the initial depression angle of 36.2 degree to the value of Delta max. The area on the ground imaged in this scan is shown as the region 300. This region includes an overscan area 302, which corresponds to a potion of the array imaging terrain further away from the aircraft in the XLOF direction that does not meet the 1-m GSD objective. This imagery can be discarded. The area 304 does meet the 1 meter GSD objective. The curved areas 306 and 308 in the scene coverage are a consequence of the forward motion of the aircraft. As the aircraft advances forward while the scanning occurs from the initial depression angle up to the value of angle Delta max, the camera images more terrain forward of the aircraft as compared to behind the aircraft, resulting in the shape of the scan area 300 and the forward projection along line 308.

At the end of the scan, the camera retraces back to the original camera depression value of 36.2 degrees and scans again. In this example, there is no scanning and collecting imagery performed in the retrace but that is certainly possible. This second scan collects imagery on the ground corresponding to the scan area 310. There is a complete overlap between the two scans 300 and 310 in the region bounded by the coverage limit depression angle and the initial camera depression angle, indicating that there are no gaps in scene coverage. This can be seen by the meeting of the corner 312 from the first scan 300 and the corner 314 in the second scan 310 covering the same spot on the ground. There is a slight underscan portion 316 in both scans, and a gap between these underscans as indicated at 320. Thus, the underscan portions 316 are disregarded when determining area coverage.

From the preceding discussion, it will be seen that we have described a hyperspectral camera system that provides both wide area coverage of the ground, high resolution, and high signal to noise ratio. As noted above, the entire spectral content for imagery of any given point on the ground is not obtained simultaneously, as it has been in the prior art. This is due the nature of the scanning described in FIGS. 13–17 and the construction and design of the array and hyperspectral filter. However, the tradeoff between simultaneity and scene coverage is well worth making, given the dramatic increase in area coverage provided by the techniques of this invention, and the attendant benefits provided for tactical aerial reconnaissance.

While the preferred embodiment described above is one for hyperspectral imaging, the techniques are readily adaptable to a lesser number of bands of the spectrum, and hence the invention is applicable to both multispectral and hyperspectral implementations.

Various modifications may be made to the disclosed embodiments without departure from the spirit and scope of the invention. The details of the preferred embodiment are disclosed for purposes of illustration of the best mode contemplated for practicing the invention, and not for purposes of limitation. For example, the array could be based on a single monolithic wafer scale chip or could be constructed as a mosaic made up of individual detectors. The selection of the type of array to use, its materials, and other implementation details can vary considerably from the disclosed embodiment. This true scope and spirit can be ascertained by referenced to the appended claims, interpreted in light of the foregoing.

We claim:

1. An imaging system comprising, in combination:
   an electro-optical imaging array arranged as a plurality of rows and columns of individual pixel elements, said array organized into a plurality of sub-arrays of rows of said pixels, each sub-array being responsive to incident radiation from a scene of interest;
   a multi-spectral or hyperspectral filter placed in registry with said electro-optical imaging array, said filter defining a plurality of individual filter bands, said filter bands arranged in optical registry with said sub-arrays whereby each of said sub-arrays receives radiation passing through one of said individual filter bands;
   a scanning device directing radiation from said scene of interest onto said imaging array, said array and scanning device constructed and arranged such that as said scene of interest is scanned over said array a given point in said scene of interest is sequentially imaged by each of said sub-arrays; and
   clocking circuitry for said imaging array for clocking individual pixel elements in each of said sub-arrays in a direction and at a rate to thereby improve the signal to noise ratio of imagery from said array.

2. The system of claim 1, wherein said clocking circuitry comprises time delay and integrate (TDI) circuitry clocking said individual pixel elements in each of said arrays in a column direction.

3. The system of claim 1, wherein said clocking circuitry further comprises two-dimensional clocking circuitry for transferring pixel information in row and column direction to thereby 1) increase the signal to noise ratio of said array and 2) to compensate for relative motion of said array with respect to said scene of interest.

4. The system of claim 1, wherein the clocking of said sub-arrays varies among said sub-arrays depending on the spectral response of the material forming said sub-arrays.

5. The system of claim 4, wherein each of said sub-arrays has separate and variable clocking of pixels in the column direction depending on the spectral responsiveness of the material forming said sub-array.

6. The system of claim 1, wherein the clocking of said sub-arrays changes dynamically depending on the spectral content of incident radiation.

7. The system of claim 1, wherein the number of pixels in said sub-arrays varies in the column direction depending on the spectral response of the material forming said sub-arrays.

8. The system of claim 1, wherein said array comprises a wafer scale two-dimensional charge-coupled device.

9. The system of claim 1, wherein each of said sub-arrays is separated from an adjacent sub-array by an output transfer register.

10. The system of claim 9, wherein said output transfer register extends across the entire width of said array, wherein said array comprises a plurality of sub-arrays each extending in the row direction and across the entire width of said array, and wherein during an exposure of said array each sub-array simultaneously images a different portion of the scene of interest and the spectral content of the entire scene of interest is captured by scanning said scene of interest across all of said sub-arrays.

11. The system of claim 1, wherein the system comprises an aerial reconnaissance system for installation in a reconnaissance vehicle and wherein said system further comprises a mechanism for providing forward motion compensation for imagery generated by said array due to forward motion of said reconnaissance vehicle relative to said scene of interest.

12. The system of claim 1, wherein said filter further comprises a covering window for said array.

13. The system of claim 1, wherein said filter defines N separate filter bands and wherein said array further comprises N sub-arrays, and wherein N is an integer greater than or equal to 4.

14. The system of claim 1, wherein said array is sensitive to infra-red radiation and generates multi-spectral or hyperspectral imagery in the infra-red band.

15. The system of claim 14, wherein said array comprises a Mercury Cadmium Telluride focal plane array.

16. The system of claim 1, wherein said array comprises a charge-coupled device and wherein said array generates hyperspectral or multi-spectral imagery in the visible band.

17. The system of claim 1, wherein each of said sub-arrays has its own read out channel to allow parallel and simultaneous readout of all sub-arrays of the array.

18. The system of claim 1, wherein each of said sub-arrays has its own read out channel to allow parallel and simultaneous readout of all sub-arrays of the array.

19. The system of claim 1, wherein said array comprises a hybrid array incorporating a CMOS readout structure.

20. The system of claim 1, wherein said array comprises a CMOS detector.

21. The system of claim 1, wherein said array comprises a photosensitive material constructed from Indium Antimonide.

22. An imaging system comprising, in combination:
an electro-optical imaging array arranged as a plurality of rows and columns of individual pixel elements, said array organized into a plurality of sub-arrays of rows of said pixels, each sub-array being responsive to incident radiation from a scene of interest;
a spectral filter arranged relative to said array simultaneously directing radiation in a plurality of different spectral bands for different portions of a scene of interest onto said array, said spectral filter and sub-arrays arranged in optical registry with one another whereby each of said sub-arrays receives radiation in one of said individual bands;
a scanning device directing radiation from said scene of interest onto said imaging array, said array and scanning device constructed and arranged such that as said scene of interest is scanned over said array a given point in said scene of interest is sequentially imaged by each of said sub-arrays; and
clocking circuitry for said imaging array clocking said individual pixel elements in each of said sub-arrays in a direction and at a rate to thereby increase the signal to noise ratio of said array.

23. The system of claim 22, wherein said clocking circuitry comprises time delay and integrate (TDI) circuitry clocking said individual pixel elements in each of said arrays in a column direction.

24. The system of claim 23, wherein said clocking circuitry comprises two-dimensional clocking circuitry for transferring pixel information in row and column directions to thereby 1) increase the signal to noise ratio of said array and 2) to compensate for relative motion of said array with respect to said scene of interest.

25. The system of claim 24, wherein the clocking of said sub-arrays varies among said sub-arrays depending on the spectral response of the material forming said sub-arrays.

26. The system of claim 22, wherein the clocking of said sub-arrays changes dynamically depending on the spectral content of incident radiation.

27. The system of claim 22, wherein the number of pixels in said sub-arrays varies in the column direction depending on the spectral response of the material forming said sub-arrays.

28. The system of claim 22, wherein said array comprises a wafer scale two dimensional charge-coupled device.

29. The system of claim 22, wherein each of said sub-arrays is separated from an adjacent sub-array by an output transfer register.

30. The system of claim 29, wherein said output transfer register extends across the entire width of said array, wherein said array comprises a plurality of sub-arrays each extending in the row direction and across the entire width of said array, and wherein during an exposure of said array each sub-array simultaneously images a different portion of the scene of interest and the spectral content of the entire scene of interest is captured by scanning said scene of interest across all of said sub-arrays.

31. The system of claim 22, wherein each of said sub-arrays has its own read out channel to allow parallel and simultaneous readout of all sub-arrays of the array.

32. The system of claim 22, wherein said filter further comprises a covering window for said array.

33. The system of claim 22, wherein said filter defines N separate filter bands and wherein said array further comprises N sub-arrays, and wherein N is an integer greater than or equal to 4.

34. The system of claim 29, wherein said array is sensitive to infra-red radiation and generates multi-spectral or hyper-spectral imagery in the infra-red band.

35. The system of claim 22, wherein said array comprises a Mercury Cadmium Telluride focal plane array.

36. The system of claim 22, wherein each of said sub-arrays has its own read out channel to allow parallel and simultaneous readout of all sub-arrays of the array.

37. The system of claim 22, wherein each of said sub-arrays has separate and variable clocking of pixels in the column direction depending on the spectral responsiveness of the material forming said sub-array.

38. The system of claim 22, wherein said array comprises a photosensitive material constructed from Indium Antimonide.

39. A method of obtaining images of a scene of interest in multiple portions of the electromagnetic spectrum with a hyperspectral or multi-spectral imaging system aboard a reconnaissance vehicle, comprising the steps of:
exposing a two-dimensional electro-optical array to said scene, said array arranged as a plurality of rows and columns of individual pixel elements, said array organized into a plurality of sub-arrays of rows of said pixels,
controlling the wavelength of the radiation impinging on each of said sub-arrays wherein each sub-array images a different band of the electromagnetic spectrum while said array is exposed, wherein said sub-arrays are exposed to said scene of interest at the same time, with each of said sub-arrays imaging a different portion of said scene of interest simultaneously in a particular band of the spectrum;
operating a scanning device for said array so as to scan across said scene of interest while said array is exposed to said scene to thereby direct adjacent portions of said scene of interest onto said imaging array; and
while said imaging array is exposed to said scene, clocking individual pixel elements of said array in a direction and at a rate to thereby increase the signal to noise ratio of the collected signal.

40. The method of claim 39, wherein said step of clocking further comprises providing time delay and integrate (TDI) circuitry clocking said individual pixel elements in each of said arrays in a column direction.

41. The method of claim 39, wherein said step of clocking comprises the step of transferring pixel information in both row and column directions to thereby 1) increase the signal to noise ratio of said array and 2) to compensate for relative motion of said reconnaissance vehicle with respect to said scene of interest.

42. The method of claim 39, wherein said step of clocking further comprises the step of varying the clocking of said sub-arrays depending on the spectral response of the material forming said sub-arrays.

43. The method of claim 39, wherein the clocking of said sub-arrays changes dynamically depending on the spectral content of incident radiation.

44. The method of claim 39, wherein the number of pixels in said sub-arrays varies in the column direction depending on the spectral response of the material forming said sub-arrays.

45. The method of wherein said array comprises a wafer scale, two-dimensional charge-coupled device.

46. The method of claim 39, wherein each of said sub-arrays is separated from an adjacent sub-array by an output transfer register.

47. The method of claim 46, wherein said output transfer register extends across the entire width of said array, wherein said array comprises a plurality of sub-arrays each extending in the row direction and across the entire width of said array, and wherein during an exposure of said array each sub-array simultaneously images a different portion of the scene of interest and the spectral content of the entire scene of interest is captured by scanning said scene of interest across all of said sub-arrays.

48. The method of claim 39, wherein said array comprises a hybrid array incorporating a CMOS readout structure.

49. The method of claim 39, wherein said array comprises a CMOS detector.

50. Imaging apparatus for use in a system obtaining hyperspectral or multi-spectral images, comprising, in combination:
   an electro-optical imaging array arranged as a plurality of rows and columns of individual pixel elements, said array organized into a plurality of sub-arrays of rows of said pixels, each sub-array being responsive to incident radiation from a scene of interest; and
   a multi-spectral or hyper-spectral filter placed in registry with said electro-optical imaging array, said filter defining a plurality of individual filter bands arranged in optical registry with said sub-arrays whereby each of said sub-arrays receives radiation passing through one of said individual filter bands,
   wherein each of said sub-arrays has separate and variable clocking of pixels in the column direction depending on the spectral responsiveness of the material forming said sub-array.

51. Imaging apparatus for use in a system obtaining hyperspectral or multi-spectral images, comprising, in combination:
   an electro-optical imaging array arranged as a plurality of rows and columns of individual pixel elements, said array organized into a plurality of sub-arrays of rows of said pixels, each sub-array being responsive to incident radiation from a scene of interest; and
   a multi-spectral or hyper-spectral filter placed in registry with said electro-optical imaging array, said filter defining a plurality of individual filter bands arranged in optical registry with said sub-arrays whereby each of said sub-arrays receives radiation passing through one of said individual filter bands;
   wherein each sub-array has a predetermined number of rows depending on the spectral responsiveness of the material forming said sub-array.

52. Imaging apparatus for use in a system obtaining hyperspectral or multi-spectral images, comprising, in combination:
   an electro-optical imaging array arranged as a plurality of rows and columns of individual pixel elements, said array organized into a plurality of sub-arrays of rows of said pixels, each sub-array being responsive to incident radiation from a scene of interest; and
   a multi-spectral or hyper-spectral filter placed in registry with said electro-optical imaging array, said filter defining a plurality of individual filter bands arranged in optical registry with said sub-arrays whereby each of said sub-arrays receives radiation passing through one of said individual filter bands
   wherein each of said sub-arrays is separated from an adjacent sub-array by an output transfer register; and
   wherein said output transfer register extends across the entire width of said array, wherein said array comprises a plurality of sub-arrays each extending in the row direction and across the entire width of said array, and wherein during an exposure of said array each sub-array simultaneously images a different portion of the scene of interest and the spectral content of the entire scene of interest is captured by scanning said scene of interest across all of said sub-arrays with a scanning device.

* * * * *